United States Patent
Imanishi et al.

(10) Patent No.: US 6,413,188 B2
(45) Date of Patent: *Jul. 2, 2002

(54) TOROIDAL TYPE CONTINUOUSLY VARIABLE TRANSMISSION

(75) Inventors: Takashi Imanishi; Nobuo Goto; Makoto Fujinami; Hiroshi Kato; Nobuaki Mitamura; Hiroyuki Itoh; Seiji Higuchi; Hiroshi Fukushima, all of Kanagawa (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/886,122

(22) Filed: Jun. 22, 2001

Related U.S. Application Data

(63) Continuation of application No. 09/344,380, filed on Jun. 25, 1999.

(30) Foreign Application Priority Data

Jan. 11, 1999 (JP) ................................. 11-3646

(51) Int. Cl.$^7$ ................................. F16H 55/32
(52) U.S. Cl. ..................... 476/72; 384/625; 476/40
(58) Field of Search ............... 476/72, 41, 42, 476/46; 384/625, 568

(56) References Cited

U.S. PATENT DOCUMENTS

| | | | |
|---|---|---|---|
| 662,374 A | 11/1900 | Dooley | |
| 4,960,004 A | 10/1990 | Hibi et al. | 74/200 |
| 5,352,303 A | 10/1994 | Murakami et al. | 148/318 |
| 5,397,188 A | 3/1995 | Yoshizuka et al. | 384/492 |
| 5,536,091 A | 7/1996 | Takata et al. | 384/609 |
| 5,720,689 A | * 2/1998 | Imanishi et al. | 476/40 |
| 5,800,072 A | 9/1998 | Buch et al. | 384/568 |
| 6,165,289 A | 12/2000 | Matsumoto et al. | 148/332 |

FOREIGN PATENT DOCUMENTS

| | | | |
|---|---|---|---|
| DE | 43 28 598 A1 | 3/1995 | F16H/15/38 |
| DE | 195 01 391 A1 | 8/1995 | F16H/15/38 |
| DE | 197 54 146 C2 | 6/1998 | F16H/15/38 |
| DE | 198 29 631 A1 | 2/1999 | F16H/15/38 |
| DE | 198 50 135 A1 | 5/1999 | F16H/15/38 |
| DE | 198 50 867 A1 | 6/1999 | F16H/15/38 |
| JP | 62-71465 | 5/1987 | F16H/15/38 |
| JP | 1-173552 | 12/1989 | F16H/15/38 |

OTHER PUBLICATIONS

Japanese Publication No. 11044352 (Abstract only).

Japanese Publication No. 07280056 (Abstract only).

* cited by examiner

*Primary Examiner*—Sherry Estremsky
*Assistant Examiner*—Tisha D. Lewis
(74) *Attorney, Agent, or Firm*—Sughrue Mion, PLLC

(57) ABSTRACT

A toroidal type continuously variable transmission, includes: at least one pair of disks concentrically disposed on each other and rotatably supported independent from each other; a trunnion swingable about a pivot shaft; a displacement shaft including a support shaft portion and a pivot shaft portion that are parallel and eccentric to each other, the support shaft portion rotatably supported to the circular hole of the trunnion through a radial bearing, the pivot shaft portion being protruded from an inner surface of the middle portion of the trunnion; a power roller nipped between the concave surfaces of the pair of disks while being rotatably supported on an outer circumferential surface of the pivot shaft portion; and a thrust bearings located between the power roller and the inner surface of the middle portion of the trunnions. An eccentric quantity of the displacement shaft being a distance between the support shaft portion and the pivot shaft portion is within a range from 5 mm to 15 mm.

2 Claims, 29 Drawing Sheets

FIG.27A
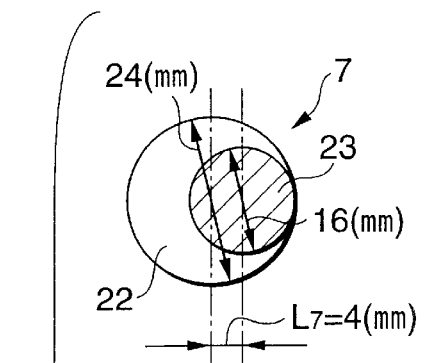
S = 201.06
I = 3217
λ = 0.0193
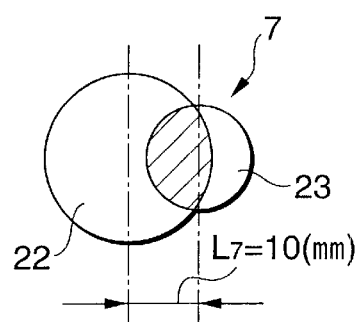
S = 117.21
I = 1848
λ = 0.0335
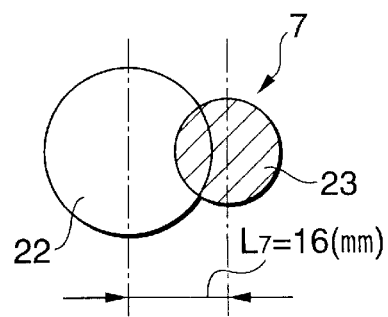
S = 31.83
I = 269
λ = 0.2308
FIG.27B
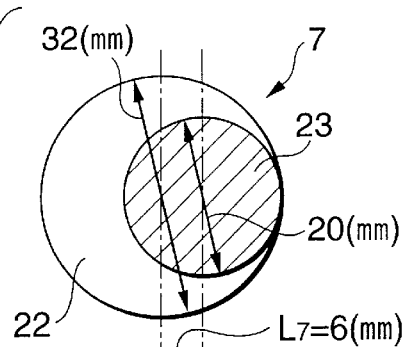
S = 314.6
I = 7854
λ = 0.0327
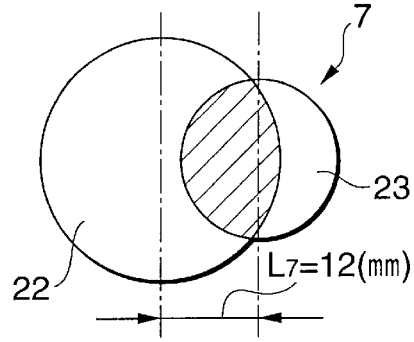
S = 214.6
I = 5370
λ = 0.0479
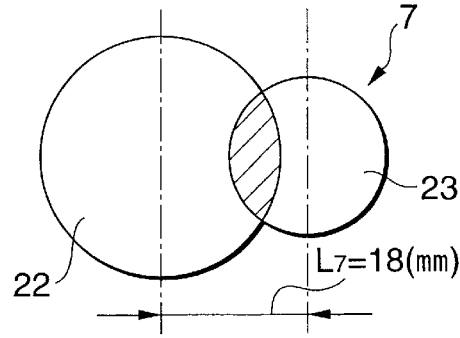
S = 99.26
I = 1944
λ = 0.1323

TOROIDAL TYPE CONTINUOUSLY VARIABLE TRANSMISSION

This is a continuation of application Ser. No. 09/344,380 filed Jun. 25, 1999, the disclosure of which is incorporated herein by reference.

BACKGROUND OF THE INVENTION

1. Field of the Invention

The present invention relates to a toroidal type continuously variable transmission which may be used as a transmission unit constituting a vehicular transmission or may be assembled as transmissions into various types of industrial machines.

2. Description of the Related Art

Study on the application of a toroidal type continuously variable transmission (as shown in FIGS. 1 and 2) into a vehicular transmission progresses. An example of the toroidal type continuously variable transmission is disclosed in Japanese Utility Model Unexamined Publication Sho.62-71465.

In a conventional toroidal type continuously variable transmission shown in FIGS. 1 and 2, an input-side disk 2 is concentrically supported to an input shaft 1. An output shaft 3 is also disposed concentrically with an input shaft 1. An output-side disk 4 is fastened to the inner end of the output shaft 3. In the inside of a casing in which the toroidal type continuously variable transmission is stored, there are located a pair of trunnions 6, 6 at an intermediate position of the both disks 2, 4 along the axial direction thereof. The trunnions 6, 6 are swingable about their respective pivot shafts 5, 5 respectively disposed at position along an imaginary plane that is perpendicular to an imaginary line connecting the respective axes of the input and output shafts 1 and 3, and distanced from the intersection of the imaginary plane and imaginary line, as shown in FIG. 1. This physical relation is hereinafter referred to as "torsional relation".

Each of the trunnions 6, 6 located distant from the center axis of the input-side disk 2 and the output-side disk 4 is concentrically provided with each of the pivot shafts 5, 5 on the outer side surfaces of the two end portions thereof. The base end portions of displacement shafts 7, 7 are respectively supported in the central portions of the trunnions 6, 6 and if the trunnions 6, 6 are swung about the pivot shafts 5, 5 respectively, the inclination angles of the displacement shafts 7, 7 can be adjusted freely. On the peripheries of the two displacement shafts 7, 7 supported on the two trunnions 6, 6, there are rotatably supported a plurality of power rollers 8, 8 respectively. The power rollers 8, 8 are respectively interposed between the inner surfaces 2a and 4a, opposed to each other, of the input-side disk 2 and the output-side disk 4. The inner surfaces 2a and 4a are formed as concave surfaces which can be obtained by rotating an arc having the pivot shaft 5 as a center thereof. And, the peripheral surfaces 8a, 8a of the power rollers 8, 8, which are formed as spherical-shaped convex surfaces are respectively in contact with the inner surfaces 2a and 4a.

Between the input shaft 1 and input-side disk 2, there is interposed a pressure device 9 of a loading cam type, while the input-side disk 2 is elastically pressed toward the output-side disk 4 by the pressure device 9. The pressure device 9 is composed of a cam plate 10 rotatable together with the input shaft 1, and a plurality of (for example, four pieces of) rollers 12, 12 which are respectively rollably held by a retainer 11.

On one side surface (in FIGS. 1 and 2, on the left side surface) of the cam plate 10, there is formed a drive-side cam face 13 being a curved surface which extends over the circumferential direction of the cam plate 10. And, on the outer surface (in FIGS. 1 and 2, on the right side surface) of the input-side disk 2, there is also formed a driven-side cam face 14 having a similar shape. The plurality of rollers 12, 12 are each rotatably supported about their respective shafts which extend in the radial direction with respect to the center of the input shaft 1.

The above-structured toroidal type continuously variable transmission operates in the following way. When the cam plate 10 is rotated with the rotation of the input shaft 1, the drive-side cam face 13 presses the plurality of rollers 12, 12 against the driven-side cam face 14 formed on the outer surface of the input-side disk 2. As a result of this, the input-side disk 2 is pressed against the plurality of power rollers 8, 8 and, at the same time the drive-side and driven-side cam faces 13 and 14 are pressed against the plurality of rollers 12, 12, so that the input-side disk 2 is rotated. The rotation of the input-side disk 2 is transmitted through the plurality of power rollers 8, 8 to the output-side disk 4, so that the output shaft 3 fastened to the output-side disk 4 is rotated.

Next, a description will be given of a case of changing of a rotational speed ratio (speed change ratio) of the input and output shafts 1 and 3. At first, when decelerating the rotational speed between the input shaft 1 and the output shaft 3, the trunnions 6, 6 are swung about the pivot shafts 5, 5 in a predetermined direction, respectively. Then, the displacement shafts 7, 7 are respectively inclined so that the peripheral surfaces 8a, 8a of the power rollers 8, 8, as shown in FIG. 1, can be respectively contacted with a near-center portion on the inner surface 2a of the input-side disk 2 and with a near-outer-periphery portion on the inner surface 4a of the output-side disk 4.

Also, on the other hand, when accelerating the rotational speed between the input and output shafts 1 and 3, the trunnions 6, 6 are respectively swung about the pivot shafts 5, 5 in the opposite direction to the predetermined direction. Then, the displacement shafts 7, 7 are respectively inclined so that the peripheral surfaces 8a, 8a of the power rollers 8, 8, as shown in FIG. 2, can be respectively contacted with a near-outer-periphery portion on the inner surface 2a of the input-side disk 2 and a near-center portion on the inner surface 4a of the output-side disk 4. When the inclination angles of the displacement shafts 7, 7 are set in the middle of the inclination angles shown in FIGS. 1 and 2, then there can be at obtained an intermediate transmission ratio between the input and output shafts 1 and 3.

A specific example of the toroidal type continuously variable transmission is shown in FIGS. 3 and 4. This transmission is disclosed in Japanese Utility Model Unexamined Publication No. Hei. 1-173552, recorded in a microfilm. As shown, an input-side disk 2 and an output-side disk 4 are rotatably supported around a cylindrical input shaft 15 with the aid of needle roller bearings 16, 16 inserted therebetween. A cam plate 10 is spline engaged with the outer peripheral surface of the end portion (in FIG. 3, the left end portion) of the input shaft 15 and is prevented, by a flange portion 17, from moving in a direction away from the input-side disk 2. Further the cam plate 10 and rollers 12, 12 constitute a pressure device 9 of a loading cam type. The pressure device 9, in accordance with the rotation of the input shaft 15, rotates the input-side disk 2 while it is pressing against the input-side disk 2 toward the output-side disk 4. An output gear 18 is coupled to the output-side disk 4 by means of keys 19, 19 so that the output-side disk 4 and the output gear 18 are synchronously rotated.

A pair of trunnions 6, 6, in particular, their respective two end portions thereof are supported on a pair of support plates 20, 20 in such a manner that they can be swung and can be displaced in the axial direction (in FIG. 3, in the front and back direction, or in FIG. 4, the horizontal directions) thereof. And, two displacement shafts 7, 7 are respectively supported in circular holes 21, 21 which are respectively formed in the middle portions of the pair of trunnions 6, 6. The two displacement shafts 7, 7 respectively include support shaft portions 22, 22 and pivot shaft portions 23, 23 which are extend in parallel to each other but are eccentric to each other. The support shaft portions 22, 22 are rotatably supported inside the circular holes 21, 21 through radial needle roller bearings 24, 24, respectively. Also, power rollers 8, 8 are rotatably supported in the peripheries of the pivotal support portions 23, 23 through another radial needle roller bearings 25, 25, respectively.

As shown in FIGS. 5 and 6 in detail, each of the radial needle roller bearings 25, 25 is constructed with a plurality of needle rollers 45, 45 and cage-like window type retainers 53 for holding rollably those needle rollers 45, 45. In this case, the outer circumferential surface of the pivot shaft portion 23 serves as a cylindrical inner raceway 54 of the radial needle roller bearing 25, and the inner circumferential surface of the power roller 8 serves as the outer raceway 55 of the radial needle roller bearing 25.

The pair of the displacement shafts 7, 7 are respectively disposed on 180 deg.-separated opposite sides with respect to the input shaft 15. Also, a direction, in which the pivot shaft portions 23, 23 of the displacement shafts 7, 7 are eccentric to the support shaft portions 22, 22, is set as the same direction with respect to the rotation direction of the input- and output-side disks 2 and 4. Also, the eccentric direction is set almost at right angles to the direction in which the input shaft 15 is disposed. Therefore, the power rollers 8, 8 are supported in such a manner that they can be somewhat displaced in the disposing direction of the input shaft 15. As a result, even when, due to accumulation of the dimensional tolerance of the components parts, the input- and output-side disks 2 and 4 are displaced from the trunnions 6, 6 in the axial direction of the input shaft 15 (in FIG. 3, the horizontal direction, or in FIG. 4, front-back direction) to some degree, adequate contact of the inner surface 2a and the inner surface 4a of the disks 2 and 4 with the peripheral surfaces 8a of the power rollers 8 is secured. Further, when the component parts are deformed by large loads imparted thereto in a transmission state of the rotational force, and as a result of the deformation, even if the power rollers 8, 8 are likely to displace in the axial direction of the input shaft 15, this displacement of the power rollers 8, 8 may be absorbed without applying excessive force to the component parts.

Also, between the outer surfaces of the power rollers 8, 8 and the inner surfaces of the middle portions of the trunnions 6, 6, there are interposed thrust ball bearings 26, 26 and thrust needle roller bearings 27 are disposed in this order from the outer surfaces of the power rollers 8. The thrust ball bearing 26, 26 are respectively used to allow the power rollers 8, 8 to rotate while supporting the load applied to the power rollers 8, 8 in the thrust direction. The thrust ball bearings 26, 26 are respectively composed of a plurality of balls 56, 56 annular-shaped retainers 57, 57 for rollably holding the balls 56, 56 therein, and annular-shaped outer races 28, 28. The inner raceways of the thrust ball bearings 26, 26 are respectively formed on the outer surfaces of the power rollers 8, 8, whereas the outer raceways thereof are respectively formed on the inner surfaces of the outer races 28, 28.

Each of the thrust needle roller bearings 27, 27 is composed of a race 58, a retainer 59 and needle rollers 60, 60. The race 58 and retainer 59 are combined together in such a manner that they can be somewhat displaced in the rotation direction. The thrust needle roller bearings 27, 27 interpose the races 58, 58 between the inner surfaces of the trunnions 6, 6 and the outer surfaces of the outer races 28, 28 in a state that the races 58, 58 are contacted with the inner surfaces of the trunnions 6, 6. The thrust needle roller bearings 27, 27 allow the pivot shaft portions 23, 23 and the races 28, 28 to rotate about the support shaft portions 22, 22 while receiving a thrust load applied to the outer races 28, 28.

Drive rods 29, 29 are respectively coupled to one end portions (left end in FIG. 4) of the trunnions 6, 6. And, drive pistons 30, 30 are respectively firmly coupled to the outer surface of the middle position of the drive rods 29, 29. The drive pistons 30, 30 are oil-tightly disposed within drive cylinders 31, 31. An amount of displacement of each of the trunnions 6, 6, which is caused by supplying oil into and discharging it from each of the drive cylinders 31, 31 is detected by a precess cam (not shown) fixed to the other end portions of the trunnions 6, 6.

A lubricating-oil supplying device as shown in FIG. 7 is provided in the insides of the drive rod 29, the trunnion 6 and the displacement shaft 7. The lubricating-oil supplying device feeds a sufficient amount of lubricating oil into the bearings 25 and 26 in order to secure the durability of the radial needle roller bearing 25 and the thrust ball bearing 26. The lubricating-oil supplying device is composed of a feeding-side oil-supply passage 42 provided in the insides of the drive rod 29 and the trunnion 6, oil-feed-holes 43, 43 formed in the outer race 28 of the thrust ball bearing 26, and a receiving-side oil-supply passage 44 provided in the inside of the pivot shaft portion 23, which constitutes the first half of the displacement shaft 7. When the toroidal type continuously variable transmission is in operation, the lubricating-oil supplying device feeds lubricating oil into the feeding-side oil-supply passage 42 with the aid of a pump (not shown) assembled into the transmission, to thereby lubricate the bearings 25 and 26.

In the thus constructed toroidal type continuously variable transmission, a rotation of the input shaft 15 is transmitted to the input-side disk 2 through the pressure device 9. A rotation of the input-side disk 2 is transmitted through the pair of power rollers 8, 8 to the output-side disk 4, and a rotation of the output-side disk 4 is output from the output gear 18. To change the rotational speed change ratio between the input shaft 15 and the output gear 18, the pair of drive pistons 30, 30 are displaced in the opposite directions to each other. In accordance with the displacement of the drive pistons 30, 30, the pair of trunnions 6, 6 displace in the opposite directions, so that the lower power roller 8 disposed in the downside of FIG. 4 displaces to the right, while at the same time the upper power roller 8 disposed in the upside of FIG. 4 displaces to the left. Accordingly, the direction of forces in the tangential direction which act on contact positions where the peripheral surfaces 8a, 8a of the power rollers 8, 8 are in contact with the inner surface 2a of the input-side disk 2 and the inner surface 4a of the output-side disk 4, is changed. In accordance with the changing of the direction of the forces, the trunnions 6, 6 are swung about the pivot shafts 5, 5 which are supported by the support plates 20, 20 in the opposite directions to each other. As a result, as shown in FIGS. 1 and 2, the contact positions where the peripheral surfaces 8a, 8a of the power rollers 8, 8 are in contact with the inner surface 2a and the inner surface 4a of the input- and output-side disks 2 and 4 are shifted, whereby the rotational speed change ratio between the input shaft 15 and the output gear 18 is changed. The control of the rotational speed change ratio to a desired value is conducted in a manner that the amounts of the displacements of the trunnions 6, 6 in the axial directions of the pivot shafts 5, 5, which are detected by the precess cam, is adjusted by adjusting the amounts of the pressurized oil charged to and discharged from the drive cylinders 31, 31.

When the rotational force is transmitted between the input shaft 15 and the output gear 18, based on the elastic deformation of the component parts, the power rollers 8, 8 are displaced in the axial direction of the input shaft 15. As a result, the displacement shafts 7, 7 which pivotally support the power rollers 8 are slightly turned about the support shaft portions 22, respectively. Due to the turning of the displacement shafts 7, 7, the outer surfaces of the outer races 28, 28 of the thrust ball bearings 26, 26 are displaced relative to the inner surfaces of the trunnions 6, 6. A force required for the relative displacement is small because the thrust needle roller bearings 27 are present between the outer surfaces of the races 28, 28 and the inner surfaces of the trunnions 6, 6. This fact implies that a force to change an inclination angle of each of the displacement shafts 7, 7 is small.

Turning now to FIGS. 8 and 9, there are shown toroidal type continuously variable transmissions increased in their transmissible torque. As shown, a couple of input disks 2A and 2B and a couple of output disks 4, 4 are arranged side by side around an input shaft 15a in the power transmission direction. In either structure (FIGS. 8 and 9), an output gear 18a is disposed in a middle portion of the input shaft 15a to be rotatably supported around the input shaft 15a. The output disks 4, 4 are spline-engaged to both ends of a cylindrical sleeve 32 provided in the central portion of the output gear 18a. Needle roller bearings 16, 16 are respectively provided between the inner circumferential surfaces of the output disks 4, 4 and the outer circumferential surface of the input shaft 15a. With provision of the needle roller bearings 16, 16, the output disks 4, 4 are supported around the input shaft 15a so as to be rotatable about the input shaft 15a and movable in the axial direction of the input shaft 15a. The input disks 2A and 2B are supported at both ends of the input shaft 15a while being rotatable together with the input shaft 15a. The input shaft 15a is rotatable driven by a drive shaft 33 through the pressure device 9 of the loading cam type. There is provided a radial bearing 34, such as a sliding bearing or a needle roller bearing, is disposed between the outer circumferential surface of the tip end (right end of in FIGS. 8 and 9) of the drive shaft 33 and the inner circumferential surface of the base end (left end in FIGS. 8 and 9) of the input shaft 15a. Therefore, the drive shaft 33 and the input shaft 15a are concentrically combined with each other such that those shafts are slightly movable in the rotational direction.

The rear surface of input-side disk 2A (located on the right side in FIGS. 8 and 9) is thrust against a loading nut 35 directly (in the structure shown in FIG. 9) or with a coned disk spring 36 having large resilience being interposed therebetween (in the structure shown in FIG. 8), to thereby substantially prevent the displacement of the input-side disk 2A in the axial directions (horizontal directions in FIGS. 8 and 9) of the input shaft 15a. On the other hand, the input-side disk 2B facing the cam plate 10 is supported to be movable in the axial direction of the input shaft 15a with the aid of a ball spline 37. A coned disk spring 38 and a thrust needle roller bearing 39 are serially disposed between the rear surface (right-side surface in FIGS. 8 and 9) of the input-side disk 2B and the front surface (right-side surface in FIGS. 8 and 9) of the cam plate 10. The coned disk spring 38 functions so as to impart pre-load to contact portions where the inner surfaces 2a of the input-side disks 2A and 2B and the inner surface 4a of the output-side disk 4 are in contact with the peripheral surfaces 8a, 8a of the power rollers 8, 8. The thrust needle roller bearing 39 allows the input-side disk 2B to rotate relative to the cam plate 10 when the pressure device 9 operates.

In the structure of FIG. 8, the output gear 18a is rotatably supported while the axial displacement thereof being prevented, on a partitioning wall 40 provided inside of the housing, by a pair of ball bearings 41, 41 of the angular type. In the structure of FIG. 9, the output gear 18a is axially displaceable. In the toroidal type continuously variable transmission of the double cavity type in which the couple of input-side disks 2A and 2B and the couple of output-side disks 4, 4 are arranged side by side in the power transmission direction, as shown in FIGS. 8 and 9, one of the input-side disks 2A and 2B, which faces the cam plate 10 or both of them is or are axially movable with respect to the input shaft 15a by means of the ball spline 37, 37a. The reason for this is that the transmission structure is designed so as to allow the input-side disks 2A and 2B to displace in the axial directions of the input shaft 15a, while securing the synchronous rotations of the input-side disks 2A and 2B, based on the elastic deformation of the related component parts due to operations of the pressure device 9.

The ball spline 37 and ball spline 37a include inner-diameter ball-spline grooves 62 formed in the inner circumferential surfaces of the input-side disks 2A and 2B, outer-diameter ball-spline grooves 63 formed in the outer circumferential surfaces of the intermediate portion of the input shaft 15a, and a plurality of balls 64, 64 rollably provided between the inner-diameter ball-spline grooves 62 and the outer-diameter ball-spline grooves 63. As for the ball spline 37 for supporting the input-side disk 2B located closer to the pressure device 9, a stopper ring 66 is retained in a stopper groove 65 formed in a portion of the inner circumferential surface of the input-side disk 2B, which is closer to the inner surface 2a thereof, to thereby limit the balls 64, 64 in displacing toward the inner surface 2a of the input-side disk 2B. Further, it prevents the balls 64, 64 from slipping off from between the inner-diameter ball-spline grooves 62 and the outer-diameter ball-spline grooves 63. As for the ball spline 37a for supporting the input-side disk 2A located apart from the pressure device 9 in the transmission structure of FIG. 8, a stopper ring 66a is retained in a stopper groove 65a formed in the outer circumferential surface (a portion thereof closer to the left end in FIG. 8) of the input shaft 15a, to thereby limiting the balls 64, 64 in displacing toward the inner surface 2a of the input-side disk 2A.

In the known or proposed toroidal type continuously variable transmission, less consideration is given to the eccentric quantities of the displacement shafts 7, 7 for supporting respectively the power rollers 8, 8 on the inner surfaces of the intermediate portions of the trunnions 6, 6. The support shaft portion 22, 22 and the pivot shaft portion 23, 23 are parallel to each other, but the former is eccentric from the latter, viz., their centers are not coincident with each other (FIGS. 13, 24 and 25). Little qualitative consideration has been made on an eccentric quantity $L_7$ present between the support shaft portion and the pivot shaft portion 23, 23. The study by inventor(s) on the toroidal type continuously variable transmission showed the following fact: To extract desired performances of the toroidal type continuously variable transmission, it is essential to place the eccentric quantity $L_7$ within a proper range of eccentric quantity values. This fact will be described by use a case where the toroidal type continuously variable transmission of the double cavity type as shown in FIG. 10 is in a maximum deceleration state where trouble occurrence is most frequent.

When the eccentric quantity $L_7$ is excessively small, the speed change ratio of the toroidal type continuously variable transmission shifts from a desired speed change ratio for the following reason. To absorb the dimensional tolerance of the component parts and the elastic deformations of those parts during the power transmission, the pivot shaft portion 23 constituting each displacement shafts 7 revolves around the support shaft portion 22. For example, at the time of the transmission of power, a thrust load that is generated by the pressure device 9 thrusts the output-side disk 4. The output-side disk 4 is elastically displaced from a position (dot chain line in FIG. 11) to another position (solid line in FIG. 11), and the input-side disk 2B is displaced toward the output-side disk 4 (right side in FIG. 11). In accordance with the displacement, the power roller 8 held between the inner surface 2a of the input-side disk 2B and the inner surface 4a of the output-side disk 4 moves in the axial direction (referred to as an x-direction, for ease of explanation) of the input shaft 15a. With the movement, the trunnion 6, the displacement shaft 7 and the power roller 8 changes from their disposition of FIG. 12A to another disposition of FIG. 12B. The change of the disposition of those components results from the revolution of the pivot shaft portion 23 with respect to the support shaft portion 22. Therefore, the pivot shaft portion 23 and the power roller 8 move also in the axial direction (referred to as a y-direction, for ease of explanation) of the pivot shafts 5, 5 which pivotally supports the trunnion 6 as well as in the x-direction, as shown in FIGS. 13A and 13B.

The movement of the pivot shaft portion 23 and the power roller 8 in the y-direction, as seen from the above description, is the same as the operation of them in a case where the trunnions 6 are displaced in the axial direction of the pivot shafts 5, 5 by moving forward and backward the drive rods 29 (see FIG. 4) to change an inclination angle of the power roller 8 for the purpose of changing the rotational speed change ratio of the input-side disk 2B and the output-side disk 4. Accordingly, when the power roller 8 displaces in the x-direction, on the basis of the displacement in the y-direction which is simultaneously applied, the power roller 8 is displaced by a distance corresponding to the displacement in the y-direction caused by the revolution, although the trunnion 6 per se does not displace in the y-direction. When a degree of speed change (speed change quantity), which is caused by such a displacement of the power roller is small, no problem arises. When it is too much large, the speed change ratio cannot be controlled as desired.

To control the speed change ratio of the toroidal type continuously variable transmission, a controller decides a target speed change ratio based on a signal representative of throttle-valve position, engine speed, or running speed; an instruction signal indicative of the target speed change ratio is applied to a related electric motor; and controls the switching of a hydraulic-pressure control valve, and thus operates the drive pistons 30 (FIG. 4). And, the contact positions where the peripheral surfaces 8a of the power rollers 8 are in contact with the inner surface 2a of the input-side disk 2 (2A, 2B) and the inner surface 4a of the output-side disk 4 are shifted to other positions, so as to change the inclination angles of the power rollers 8. However, where a quantity y8 of a displacement of the power roller 8 in the y-direction, caused by the revolution motion, is increased, another action not caused by the signals stated above exists in addition to the action for the changing of the speed change ratio, which is caused by the drive pistons 30, 30. Therefore, the toroidal type continuously variable transmission changes its speed change ratio. Further, an actual speed change ratio is greatly deviated from the target one, and the toroidal type continuously variable transmission operates in a region out of an optimum region of its characteristic where the fuel consumption by the engine is efficient and the output power of the engine is high. This situation should be avoided.

In the conventional technique, it is considered that the preferable way to suppress the y-directional movement of the power roller 8, which is produced when the power roller 8 is moved in the x-direction is to secure the eccentric quantity $L_7$ of the support shaft portions 22, 22 from the pivot shaft portions 23, 23 as large as possible. Further, it is recognized that where the eccentric quantity $L_7$ is excessively large, a cross sectional area of the joint portion where the support shaft portions 22, 22 and the pivot shafts portions 23, 23 are jointed together is small, and as a result, a stress generated in the joint portion is great and in this condition it is very difficult to secure a satisfactory durability of the displacement shafts 7, 7. Therefore, the designer considers that the eccentric quantity $L_7$ has certain values of the upper limit, and they determine the eccentric quantity $L_7$ on the basis of the best balance between the securing of the durability of the displacement shaft and the suppressing of the y-directional component.

As described above, the conventional design of the eccentric quantity $L_7$ between the support shaft portions 22, 22 and the pivot shaft portions 23, 23 constituting the displacement shafts 7, 7 is not based on definite rules constructed in consideration with the performance on the speed-ratio change of the toroidal type continuously variable transmission. The inventor(s) discovered that there is a specific correlation between the eccentric quantity $L_7$ and the speed-ration change performance of the toroidal type continuously variable transmission, and that the eccentric quantity $L_7$ with a specific range, provides a satisfactory speed-ratio change performance.

Further, in designing the conventional toroidal type continuously variable transmission, any special consideration has been given to the surface natures of the displacement shafts 7 which are used for supporting the power rollers 8, 8 on the trunnions 6, 6 in rotatable and displaceable fashion. Therefore, a satisfactory durability of the transmission is not always guaranteed where the transmission is used under hard conditions. The reason for this will be described with reference to FIGS. 14 through 17. When the toroidal type continuously variable transmission is in operation, the power roller 8 is strongly compressed between the input-side disk 2 and the output-side disk 4 as shown in FIG. 14. Accordingly, the center hole of the power roller 8 is deformed to be elliptical as exaggeratedly illustrated in FIG. 15. In this state, the pivot shaft portion 23 of the displacement shaft 7 is strongly thrust in the directions in which the input-side disk 2 and the output-side disk 4 are arranged.

When the power roller 8 is strongly compressed between the input-side disk 2 and the output-side disk 4, a large force thrusts the power roller 8 outwardly in the radial directions of the input-side disk 2 and the output-side disk 4 when viewed in cross section, since the peripheral surfaces 8a of the power roller 8 is engaged with the inner surface 2a of the input-side disk 2 and the inner surface 4a of the output-side disk 4. Due to the thrust forces, the trunnion 6 supporting the power roller 8 on its inner surface is elastically deformed from the configuration shown in FIG. 16A to the configuration shown in FIG. 16B. Since the support shaft portion 22 of the displacement shaft 7 is somewhat offset from the center of the trunnion 6, the displacement shaft 7 is inclined by the elastic deformation of the trunnion 6. The inclination of the displacement shaft 7 leads to partial contact of the outer circumferential surface of the pivot shaft portion 23 of the displacement shaft 7 with the needle rollers 45, 45 constituting the radial needle roller bearing 25. More particularly, as shown by oblique lattices in FIG. 17, rolling surfaces of the needle rollers 45, 45 are strongly pressed against the outer circumferential surface of the pivot shaft portion 23.

The partial contact by the elastic deformation of the power roller 8 and the partial contact by the inclination of the displacement shaft 7 are summed, so that load regions as indicated by oblique lattices in FIG. 18 appear in the pivot shaft portions 23. In those load regions, large area pressure is applied from the rolling surfaces of the needle rollers 45, 45 to the outer circumferential surfaces of the pivot shaft portions 23. The surface roughness of the rolling surface (the inner and outer raceway portions being in contact with the rolling surfaces of the needle rollers 45, 45) of a general radial needle roller bearing, used in a high speed region of 10,000 rpm or higher, is about 0.4 $\mu$mRa. However, since the rolling surfaces of the needle rollers 45, 45 are strongly contacted with the outer circumference surface of the pivot shaft portion 23 in the above load regions, an oil film is hard to be formed on the contact portions when the surface roughness of the outer circumference surface is about 0.4 $\mu$mRa.

In the portions on which large area pressure exerts, a large amount heat is generated according to the operation of the toroidal type continuously variable transmission. Those portions are also located close to traction portions where the peripheral surfaces 8a of the power roller 8 are in contact with the inner surface 2a of the input-side disk 2 and the inner surface 4a of the output-side disk 4. Elevation of temperature caused by the heat generated in the traction portions is great. Accordingly, the heat-resistance of those portions receiving the large area pressure needs to be secured for securing a satisfactory durability of the displacement shaft 7.

In addition, in the conventional toroidal type continuously variable transmission, the radial needle roller bearings 25 which rotatably support the power rollers 8 around the pivot shaft portions 23 of the displacement shafts 7, respectively, are not always satisfactory in their durability. The reason for this will be described hereunder.

Where the toroidal type continuously variable transmission is used for a transmission unit of a motor vehicle, an automotive power that is output from the engine to the input shafts 15, 15a is transmitted to the output-side disk 4, through the input-side disk 2, 2A, 2B and the power rollers 8, 8. The toroidal type continuously variable transmission may be considered in the form of the radial needle roller bearings 25, which support the power rollers 8, 8 around the pivot shaft portions 23, respectively. In this case, it is operated in an outer race rotating mode in which the power roller 8 having the outer raceway 55 revolves. A load applied to the thus radial needle roller bearing 25 is a radial component of a force, that is, a traction force, applied to the traction portions of the power roller 8 supported by the radial needle roller bearing 25, viz., the contact portions where the inner surfaces 2a of the input disks 2A and 2B and the inner surface 4a of the output-side disk 4 are in contact with the peripheral surfaces 8a of the power rollers 8.

The radial load applied to the radial needle roller bearing 25 varies depending on the output power (in particular torque) of the engine and a changing state of the speed change ratio of the toroidal type continuously variable transmission. In the case of a normal aspiration engine of the displacement volume of 2,000 to 3,000 cc, the radial load is approximately 500 to 700 kgf (5000 to 700N) under the condition that the toroidal type continuously variable transmission is in a maximum deceleration state and a maximum torque input state. In the case of the natural aspiration engine of 800 cc to 1500 cc in displacement volume, it is approximately 200 to 400 kgf (2000 to 4000N) under the same condition as above.

The radial needle roller bearing 25 is capable of sufficiently enduring such a radial load if it is under a general load loading condition. However, the power roller 8, which functions as the outer race of the radial needle roller bearing 25, is repeatedly elastically deformed due to loads from the inner surface 2a of the input-side disk 2, 2A, 2B and the inner surface 4a of the output-side disk 4. Therefore, an excessive area pressure acts on a part of the rolling contact surface, and the durability of the power roller 8 is possibly lost. This will be described with reference to FIGS. 19 to 22.

When the toroidal type continuously variable transmission is in operation, loads indicated by an arrow $\alpha$ in FIGS. 19 to 20 are imparted to two opposed positions on each of the power rollers 8, 8 from the inner surface 2a of the input-side disk 2, 2A, 2B and the inner surface 4a of the output-side disk 4. As seen from FIGS. 19 to 20, those loads are directed toward the positions on the power rollers 8, 8 closer to the trunnions 6, 6. When the loads directed to the arrow $\alpha$ are increased in value, the inside diameters of the power rollers 8, 8 are elastically deformed as exaggeratedly shown in FIG. 21, the outer raceway 55 is deformed to be elliptical in cross section as exaggeratedly illustrated in FIG. 22. In this case, the amount of deformation of the outer raceway 55 is not caused in the axial direction of the radial needle roller bearing 25 and increases in quantity toward the trunnions 6, 6 with respect to the radial direction thereof. At a specific portion in the circumferential direction of the outer raceway 55, the elastic deformation inwardly in the radial direction thereof is conducted two times during one turn of each power roller 8.

As the result of the elastic deformation of the outer raceway 55, the distance between the inner raceway 54 and the outer raceway 55 of the radial needle roller bearing 25 becomes narrower at two opposite positions in the radial direction where it faces the inner surface 2a of the input-side disk 2, 2A, 2B and the inner surface 4a of the output-side disk 4, and it is close to the trunnion 6. At those positions, the needle rollers 45, 45 of the radial needle roller bearing 25 are forcibly compressed between the inner raceway 54 and the outer raceway 55. As a result, an excessive area pressure, which is due to an edge load, is applied to parts of the inner raceway 54 and the outer raceway 55, which face the ends of the needle rollers 45, 45 (when axially viewed) The excessive area pressure causes early flaking-off on those portions.

When the portions are damaged by such pressure-flaking, sound and vibration generated at the radial needle roller bearing 25 become large. As a result, sounds and vibrations generated by not only the toroidal type continuously variable transmission having the radial needle roller bearings assembled thereinto but also the transmission unit having the toroidal type continuously variable transmission, are increased. This adversely affects the drive feeling of the vehicle having the transmission unit. Further, when flakes separated from the traces enter into the traction portion transmitting the automotive power, the area pressure excessively increases thereat. This possibly causes the damages such as the flaking in the early stage in the inner surface 2a of the input-side disk 2, 2A, 2B and the inner surface 4a of the output-side disk 4, and the peripheral surfaces 8a, 8a of the power rollers 8, 8, which form the traction portion. Moreover, the strainer and the filters may be clogged with the flakes thus caused. This results in reduction of the discharge amount of the pump for supplying the lubricating oil, poor lubricating, and reduction of lifetime of other parts.

SUMMARY OF THE INVENTION

Accordingly, a first object of the present invention is to provide a toroidal type continuously variable transmission in which the eccentric quantity between the support shaft portion and the pivot shaft portion is optimized and hence good speed-ratio change performance is ensured.

Further, a second object of the present invention is to provide a toroidal type continuously variable transmission with pivot shaft portions, which is high in durability and reliability by making it easy to form an oil film on the contact portions where the outer circumferential surfaces of the pivot shaft portions are contacted with the rolling surfaces of the needle rollers, and by increasing the durability of the displacement shaft including the pivot shaft portion through the improvement of the heat resistance of the outer circumferential surfaces of the pivot shaft portions.

Accordingly, an object of the present invention is to provide an input disk unit of a toroidal type continuously variable transmission which succeeds in solving the problems arising from the radial load of the radial needle roller bearings.

According to the first aspect of the present invention, there is provided a toroidal type continuously variable transmission, including: at least one pair of disks, each one surface in the axial direction of which has a concave surface being arcuate in cross section, the disks concentrically disposed on each other and rotatably supported independent from each other in a state that the concave surfaces are opposed to each other; a trunnion swingable about a pivot shaft situated at a torsional relation with respect to a center axis of the pair of disks, the trunnion having a circular hole formed in a direction perpendicular to the axial direction of the pivot shaft at a middle portion thereof; a displacement shaft including a support shaft portion and a pivot shaft portion that are parallel and eccentric to each other, the support shaft portion rotatably supported to the inner surface of the circular hole through a radial bearing, the pivot shaft portion being protruded from an inner surface of the middle portion of the trunnion; a power roller having an arcuate convex surface on the peripheral surface thereof, the power roller nipped between the concave surfaces of the pair of disks while being rotatably supported on an outer circumferential surface of the pivot shaft portion; and a thrust bearings located between the power roller and the inner surface of the middle portion of the trunnions, wherein an eccentric quantity of the displacement shaft being a distance between the support shaft portion and the pivot shaft portion is within a range from 5 mm to 15 mm.

The toroidal type continuously variable transmission, like the conventional one, transmits a rotational force between the input-side disk and the output-side disk, and changes a rotational speed ratio of the input-side disk and the output-side disk by changing the inclination angle of the trunnion.

In case of the continuously variable transmission of the invention, the eccentric quantity of the displacement shaft, which supports the power roller on the trunnion is controlled to be within a predetermined range. Therefore, the inclination angle of the trunnion and the power roller about the pivot shafts can exactly be adjusted in according with the displacement quantity of the trunnion over the axial direction of the pivot shaft. As a result, the rotational speed ratio of the input- and output-side disks can be accurately adjusted as desired, to thereby improve the speed change performances of the continuously variable transmission.

According to the second aspect of the invention, there is provided a toroidal type continuously variable transmission, including: at least one pair of disks, each one surface in the axial direction of which has a concave surface being arcuate in cross section, the disks concentrically disposed on each other and rotatably supported independent from each other in a state that the concave surfaces are opposed to each other; a trunnion swingable about a pivot shaft situated at a torsional relation with respect to a center axis of the pair of disks, the trunnion having a circular hole formed in a direction perpendicular to the axial direction of the pivot shaft at a middle portion thereof; a displacement shaft including a support shaft portion and a pivot shaft portion that are parallel and eccentric to each other, the support shaft portion rotatably supported to the inner surface of the circular hole through a radial bearing, the pivot shaft portion being protruded from an inner surface of the middle portion of the trunnion; a power roller having an arcuate convex surface on the peripheral surface thereof, the power roller nipped between the concave surfaces of the pair of disks while being rotatably supported on an outer circumferential surface of the pivot shaft portion through a radial needle roller bearing; and a thrust bearings located between the power roller and the inner surface of the middle portion of the trunnions, wherein a portion of the outer circumferential surface of the pivot shaft portion contactable with the rolling surfaces of the needle rollers of the radial needle roller bearing has a smoothed surface having a surface roughness of 0.2 $\mu$mRa or less, and formed by superfinishing.

Further, in the toroidal type continuously variable transmission of the invention, the displacement shafts are made of steel, the outer peripheral surface of at least the pivot shaft portion of the displacement shaft is formed with a carbonitriding layer containing 0.8 to 1.5 wt % of carbon and 0.05 to 0.5 wt % of nitrogen, and at least the outer peripheral surface is quenched and tempered after the carbonitriding process thereof.

Further, in the continuously variable transmission, the displacement shafts are made of steel, and a carbonitriding layer containing 0.8 to 1.5 wt % of carbon and 0.05 to 0.5 wt % of nitrogen is formed on a surface portion of the outer peripheral surface of at least the drive shaft of the displacement shaft, and following the carbonitriding process, at least the surface portion is quenched and tempered.

The toroidal type continuously variable transmission, like the conventional one, transmits a rotational force between the input-side disk and the output-side disk, and changes a rotational speed ratio of the input-side disk and the output-side disk by changing the inclination angle of the trunnion.

In the toroidal type continuously variable transmission according to the second aspect of the invention, an oil film is easy to form on the contact portion where the outer peripheral surface of the pivot shaft portion is in contact with the rolling surfaces of the needle rollers of the radial needle roller bearing. The oil film formed effectively prevents damages (e.g., early flaking) of the outer peripheral surface of the pivot shaft portions.

Since the carbonitriding layer is formed on the outer peripheral surface of the pivot shaft portions, its heat resistance is high enough to prevent the outer peripheral surface from damaging such as the early flakes. Moreover, according to a third aspect of the invention, there is provided a toroidal type continuously variable transmission, including: first and second disks concentrically disposed on each other and rotatably supported about a mutual central axis, the first and second disks respectively having arcuate concave surfaces, which are opposed to each other; trunnions swingable about a pivot shaft situated at a torsional relation which does not intersect with the central axis and is a position perpendicular to the central axis; a displacement shaft disposed on a middle portion of the trunnion and supported in such a manner as to project from an inner surface of the trunnion; and a power roller disposed on an inner surface side of the trunnion and nipped between the first and second disks in such a manner as to be rotatably supported on the periphery of the displacement shaft through a radial bearing; the peripheral surface of the power roller having an arcuate convex surface contactable with the concave surfaces of the first and second disks, wherein the radial bearing is a radial needle roller bearing with a retainer and a plurality of needle rollers, the needle rollers are crowned at both end portions in the axial direction thereof, and a crowning quantity of the needle roller is 0.15 to 0.65% of the outer diameter of the center portion of the needle roller in the axial direction thereof at a position closer to the center portion side of the needle roller from an end face thereof by 5 to 15% of the axial length of the needle roller.

The toroidal type continuously variable transmission, like the conventional one, transmits a rotational force between the input-side disk and the output-side disk, and changes a rotational speed ratio of the input-side disk and the output-side disk by changing the inclination angle of the trunnion.

In the continuously variable transmission accoding to the third aspect of the invention, proper amounts of crowning is applied to the needle rollers of the radial needle roller bearings, which rotatably support the power rollers on the displacement shafts. Therefore, the invention prevents excessive area pressure from being applied to the component parts of the radial needle roller bearings.

BRIEF DESCRIPTION OF THE DRAWINGS

FIGS. 27A and 27B are views showing the relation of the eccentric quantities with the cross sectional areas and the moment of inertial of area of the joint portions, and the deformation quantities of the displacement shafts in the axial direction of the pivot shafts, relating to the two displacement shafts shown in FIGS. 26A and 26B each having three different eccentric quantities;

DETAILED DESCRIPTION OF THE PREFERRED EMBODIMENTS

Figure 1:
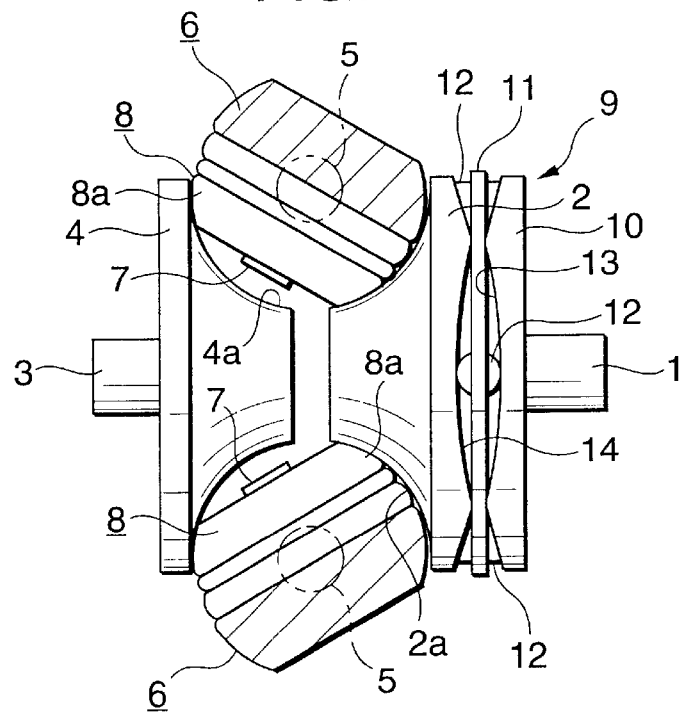
FIG. 1 is a side view schematically showing a basic structure of a conventional toroidal type continuously variable transmission when it is in a maximum deceleration state.

Some preferred embodiments of a toroidal type continuously variable transmission constructed according to the present invention will be described with reference to the accompanying drawings.

[First Embodiment]

The toroidal type continuously variable transmission of a first embodiment may be characterized in that an eccentric quantity $L_7$ between the support shaft portion 22 and the pivot shaft portion 23, constituting the displacement shaft 7 for supporting the power roller 8 with respect to the trunnion 6, is selected to be within a predetermined range of quantity values, whereby a rotational speed ratio of the input-side disk 2 (2A, 2B) to the output-side disk 4 is set at a desired one. The remaining structure of the continuously variable transmission is substantially the same as of the conventional or proposed toroidal type continuously variable transmission, which was already described with reference to FIGS. 3 through 8. For this reason, no further description and illustration of the structure will be given except some portions required for explanation of the invention. A description will be given of the process that the inventor(s) discovered the fact that when the eccentric quantity $L_7$ of the support shaft portion 22 with respect to the pivot shaft portion 23 is selected to be within a range from 5 to 15 mm, the rotational speed ratio can be set at a desired one.

The discovered fact is valid when a toroidal type continuously variable transmission can be used for a transmission unit of a general motor vehicle, and when the component parts of the continuously variable transmission have the following dimensions:

Outside diameters of input- and output-side disks 2 (2A, 2B) and 4:80 to 200 mm

Outside diameter of power roller 8:50 to 120 mm

Outside diameter of support shaft portion 22:10 to 40 mm

Outside diameter of pivot shaft portion 23:10 to 40 mm

Figure 13A:
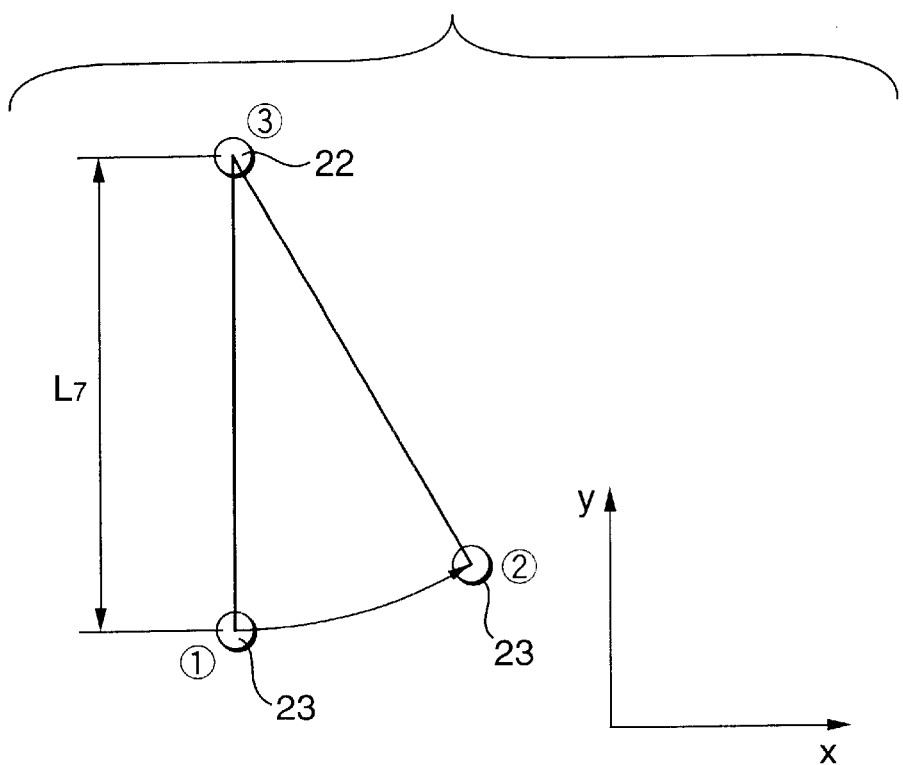
FIGS. 13A and 13B are diagrams for explaining a displacement of the center of rotation of the power roller in a state that large power is transmitted.
Figure 13B:
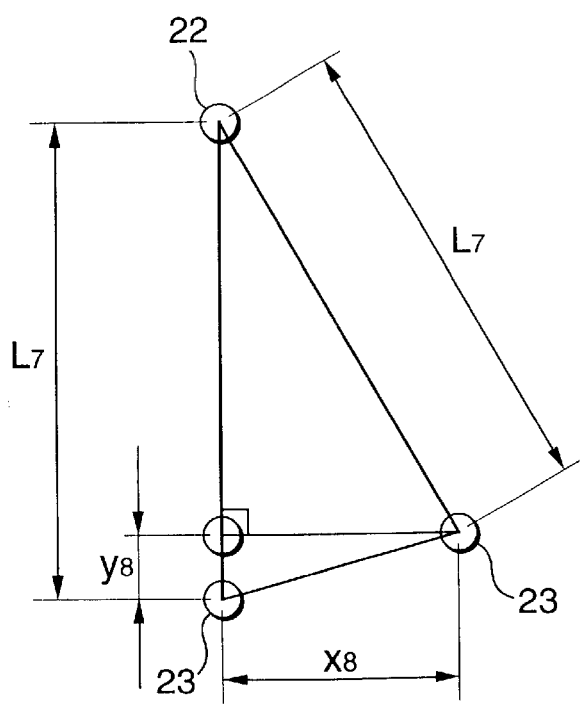
Figure 14:
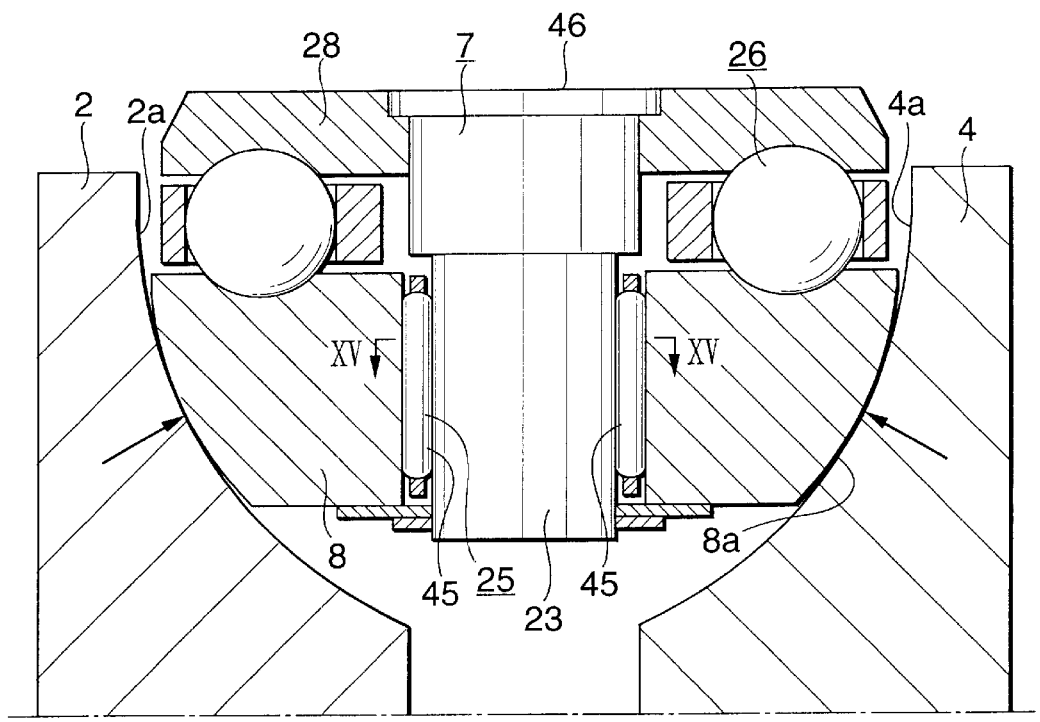
FIG. 14 is a partial cross sectional view for explaining a load applied to the power roller when the toroidal type continuously variable transmission is in operation.
Figure 15:
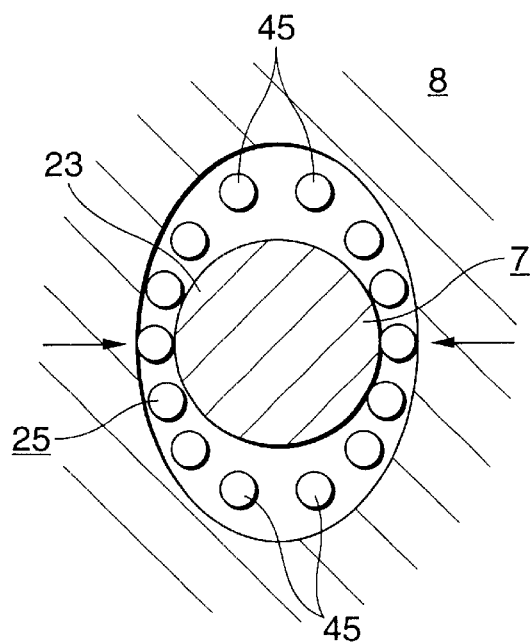
FIG. 15 is a cross sectional view taken on line XV—XV in FIG. 14.
Figure 16A:
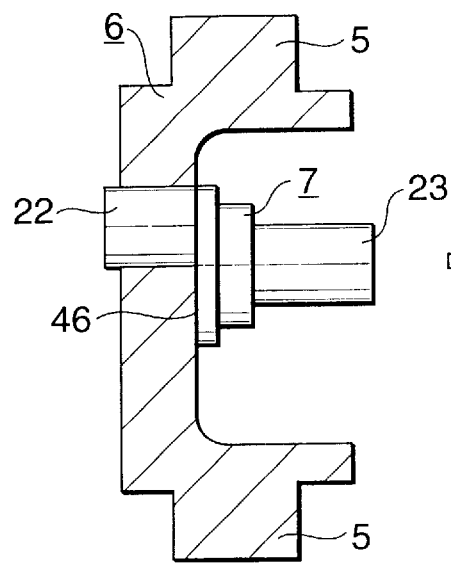
FIGS. 16A and 16B are cross sectional views showing a deformation of the trunnion when the toroidal type continuously variable transmission is in operation.
Figure 16B:
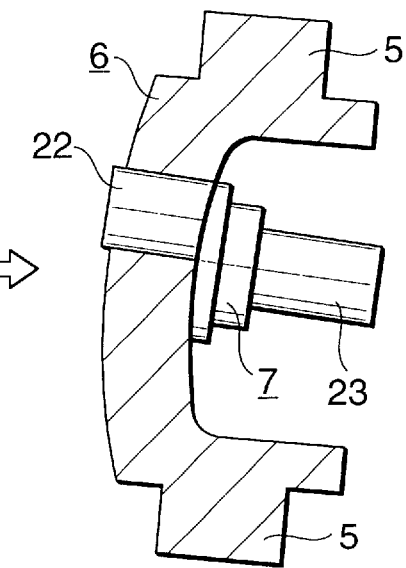
Figure 17:
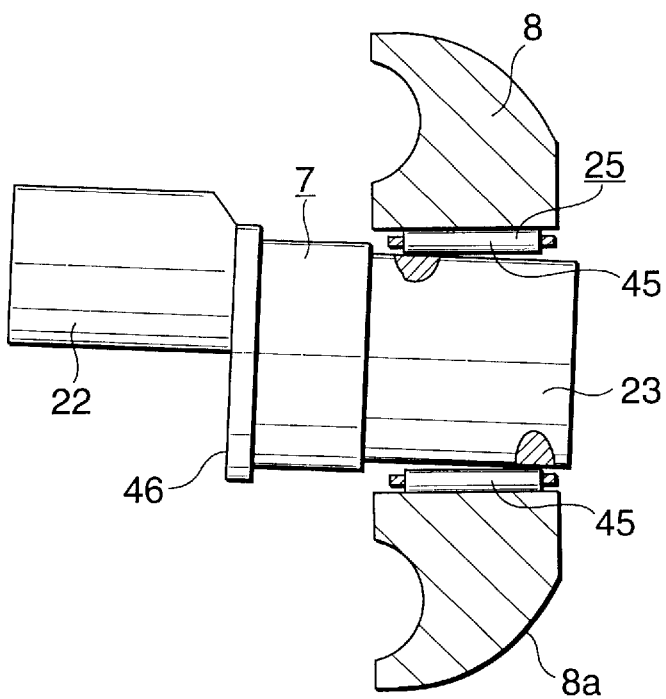
FIG. 17 is a cross sectional view for explaining load regions of the pivot shaft portion caused by an inclination of the pivot shaft.
Figure 18:
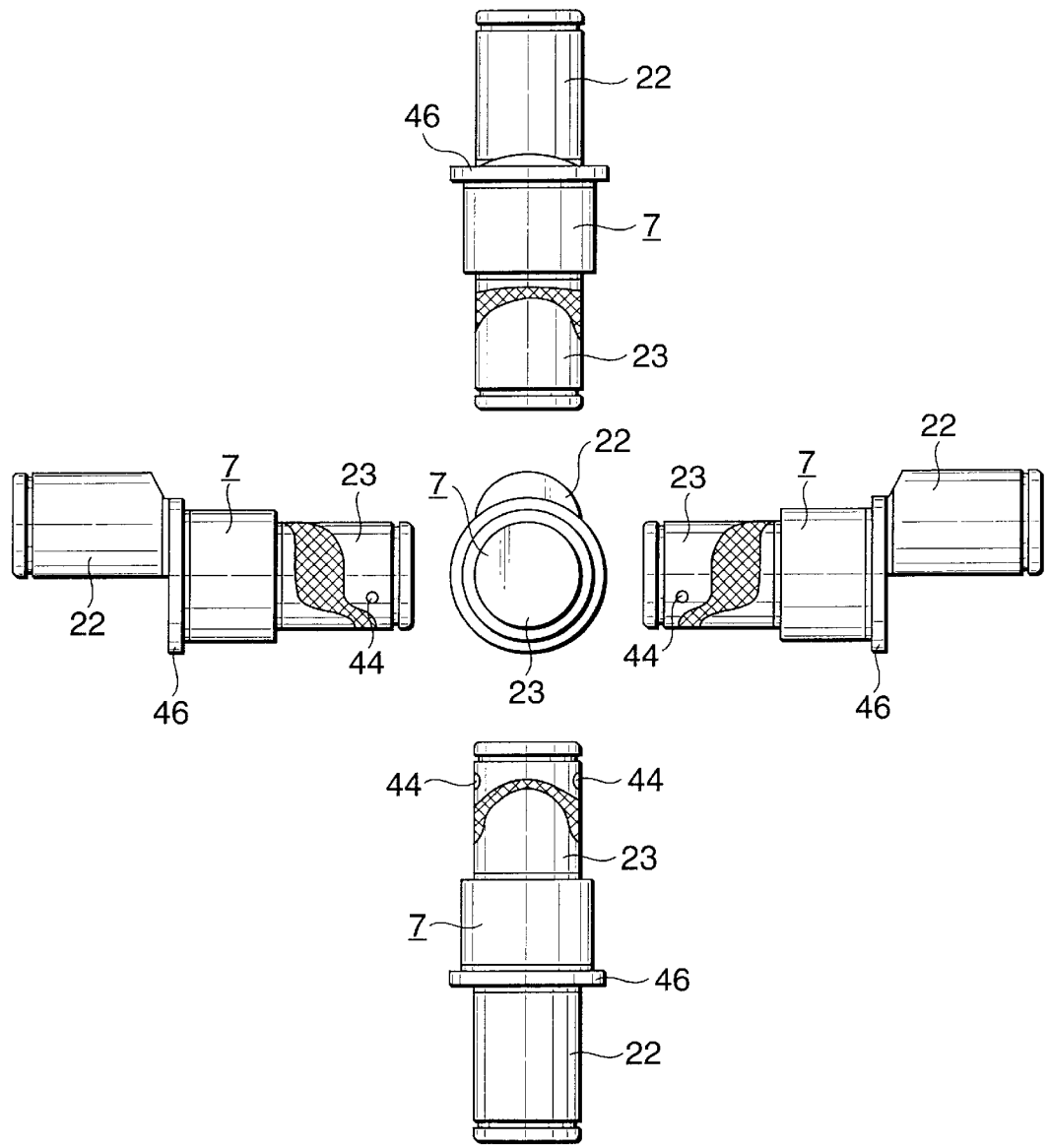
FIG. 18 is a diagram showing load regions of the pivot shaft portions caused by the inclination of the pivot shafts and deformation of the power rollers.
Figure 19:
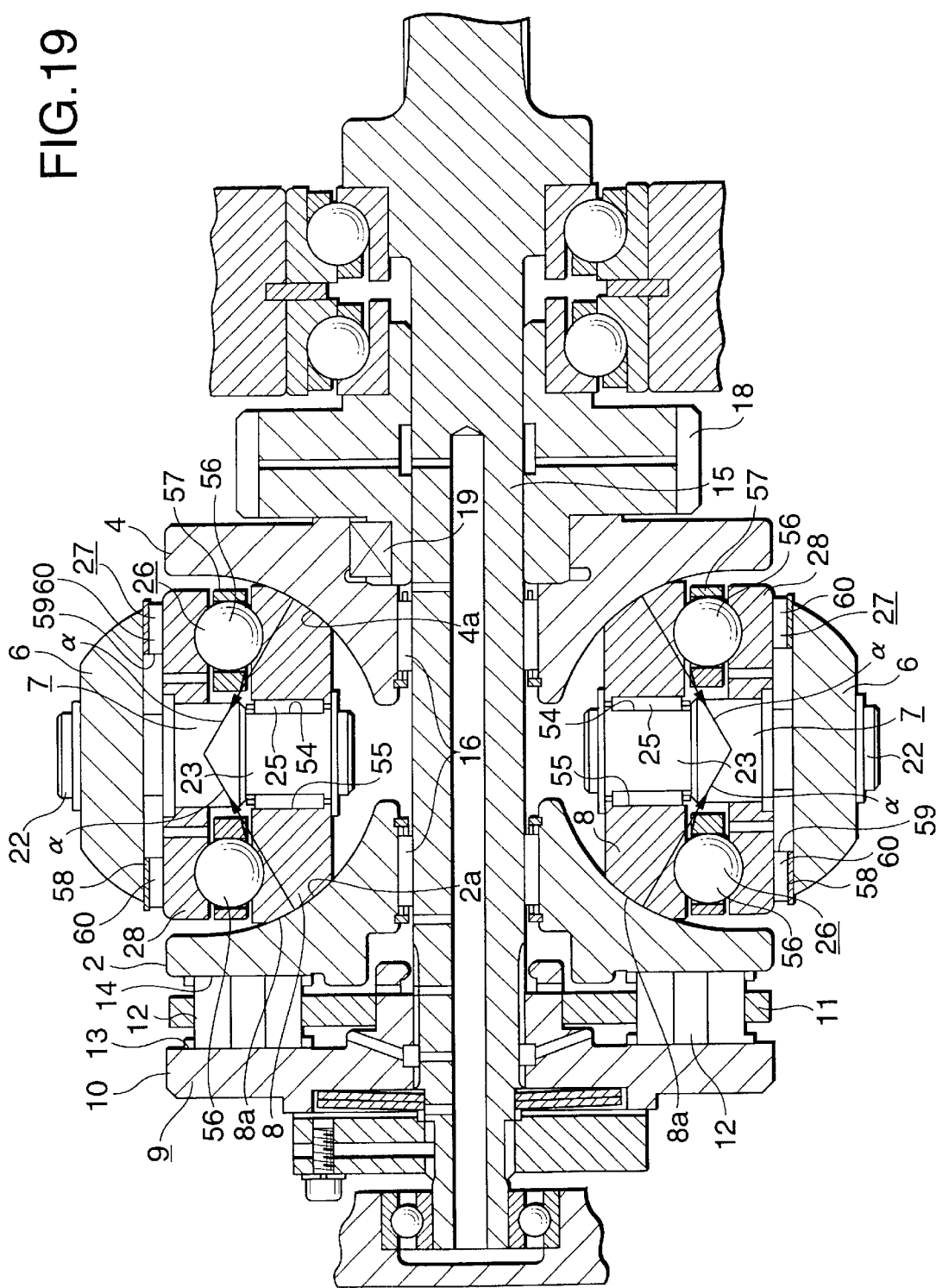
FIG. 19 is a cross sectional view for explaining loads applied to the power rollers when the continuously variable transmission similar to the structure shown in the FIG. 3 is in operation.
Figure 20:
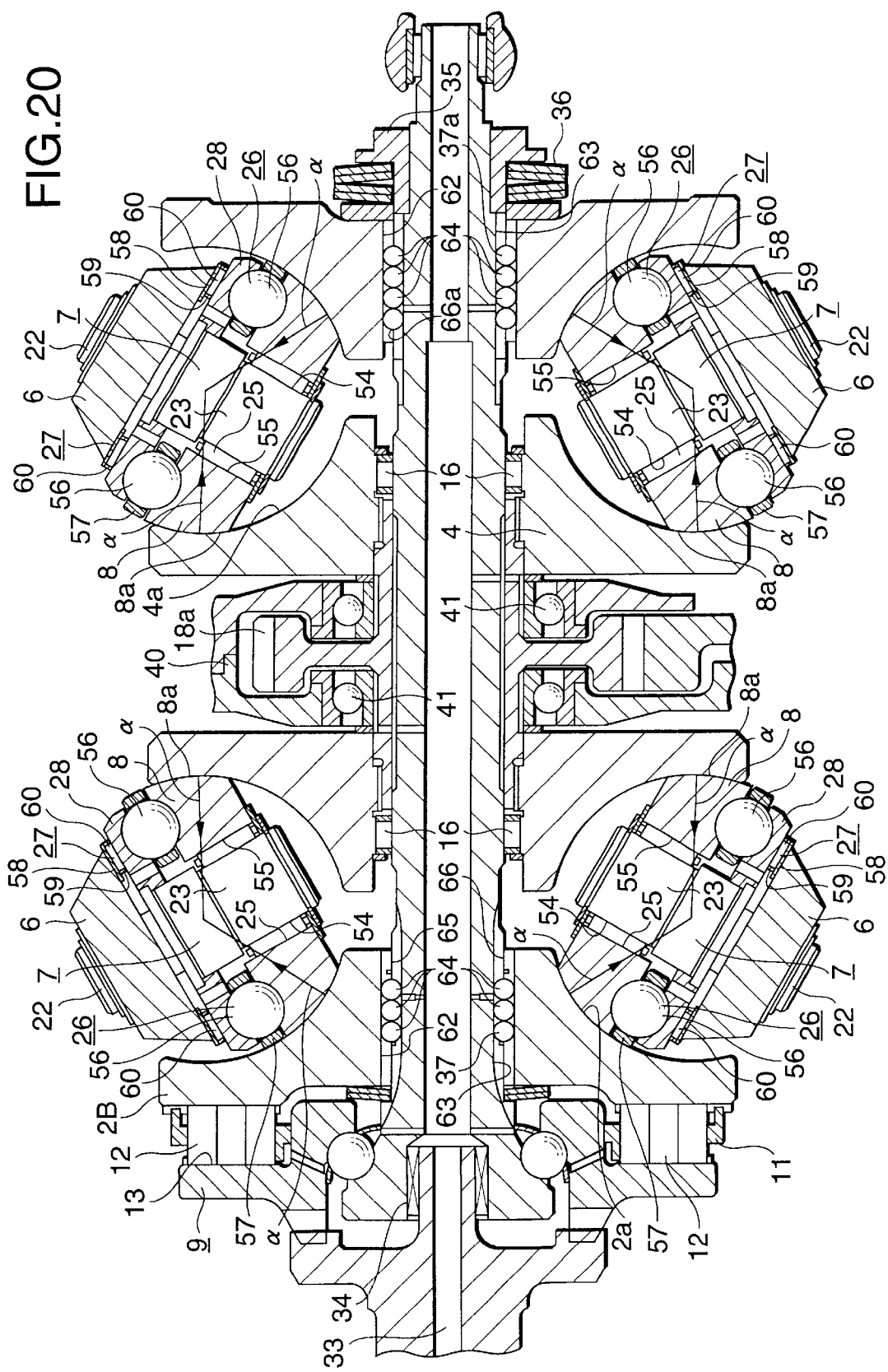
FIG. 20 is a cross sectional view for explaining loads applied to the power rollers when the continuously variable transmission similar to the structure shown in the FIG. 13 is in operation.
Figure 21:
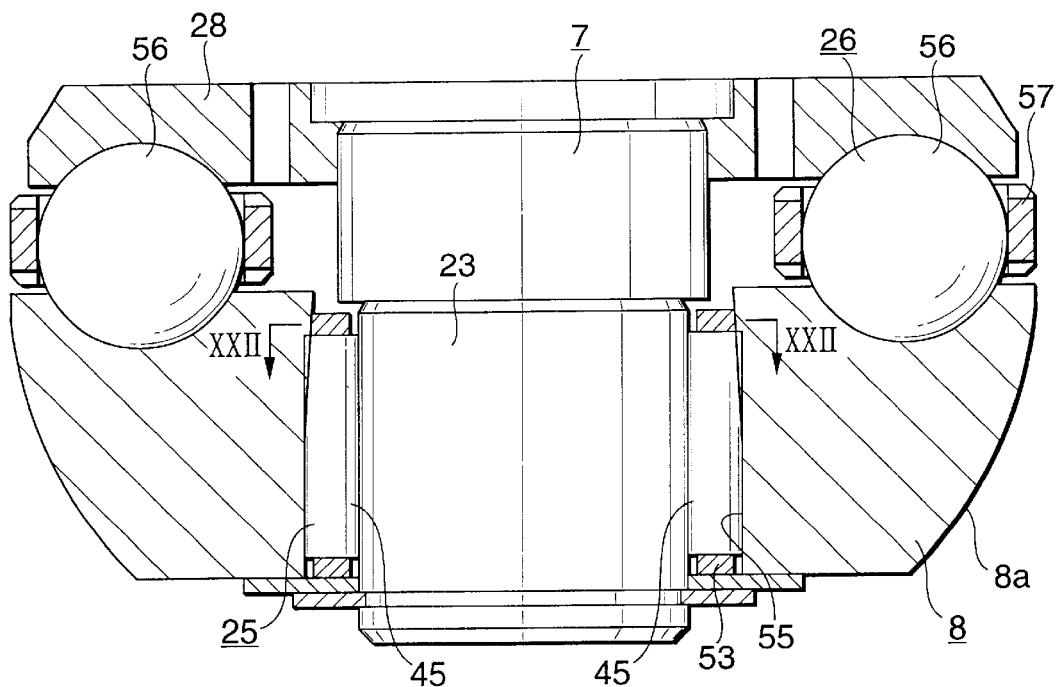
FIG. 21 is a cross sectional view showing a main portion of the conventional continuously variable transmission shown in the FIG. 5 in a state that the power roller is deformed.
Figure 22:
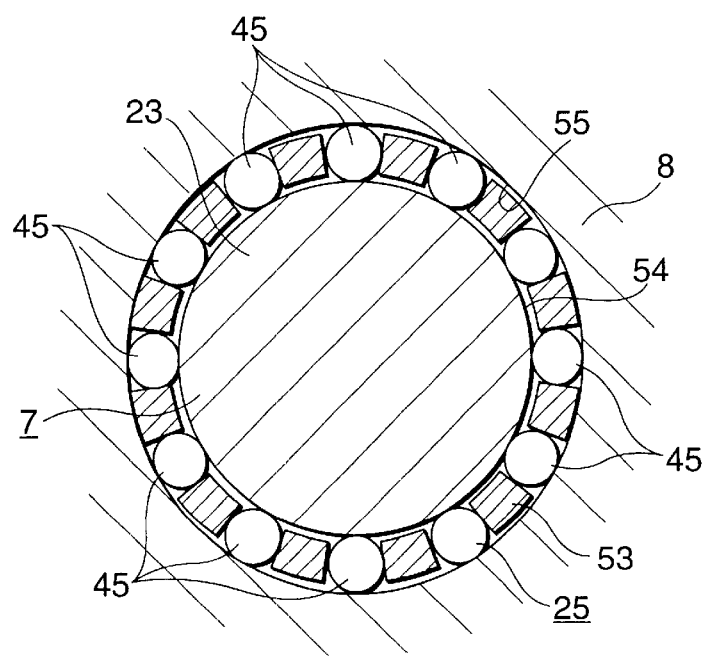
FIG. 22 is a cross sectional view taken on line XXII—XXII in FIG. 21.

Support length of power roller 8 when it is supported by pivot shaft portion 23 (=$L_{23}$ in FIG. 25, to be given later): 10 to 40 mm Torque to be input into toroidal type continuously variable transmission: 3 to 70 kg·m A first attention was paid to how the eccentric quantity $L_7$ affects an inclination angle of the power roller 8, which is directly linked with the rotational speed ratio. To absorb dimensional tolerance of the component parts and the elastic deformations of those parts during the power transmission, the pivot shaft portion 23 of the displacement shaft 7 revolves about the center of the support shaft portion 22 thereof, as shown in FIG. 13A, and the center of the pivot shaft portion 23 shifts from a point ① to another point ② of FIG. 13A. In this case, the center of the support shaft portion 22 is left at a point ③ of FIG. 13A. A displacement of the pivot shaft portion 23 produced when the pivot shaft portion 23 revolves about the support shaft portion 22 as shown in FIG. 13A can be analyzed with reference to FIG. 13B. In FIG. 13B, $L_7$ is a quantity of an eccentricity of the pivot shaft portion 23 from the support shaft portion 22; $x_8$ is a displacement of the power roller 8 toward the output-side disk 4; and $y_8$ is a displacement of the power roller 8 produced when it is displaced toward the pivot shaft 5, which pivotally supports the trunnion 6, in accordance with the displacing of the power roller 8 toward the output-side disk 4. In the chart of FIG. 13B, the following equation is established:

$$L_7^2 = (L_7 - y_8)^2 + x_8^2$$

Rearranging the above equation for $Y_8$, then we have $$y_8^2 - 2L_7 y_8 + x_8^2 = 0$$

A displacement $Y_8$ toward the pivot shaft 5 is given by $$y_8 = L_7 - \sqrt{(L_7^2 - x_8^2)}$$

Design and test of various toroidal type continuously variable transmissions of small power to large power were made. The experience shows that in the case of the toroidal type continuously variable transmissions for motor vehicles, when it is in a maximum deceleration state and a maximum torque input state as already shown in FIG. 10, the displacement $x_8$ is within approximately 1.5 to 2.5 mm as the total of the dimensional tolerance and the elastic deformations of the component parts of the continuously variable transmission. That is, the displacement $x_8$ in case of the continuously variable transmission for small power is substantially 1.5 mm, and the displacement x8 in case of the continuously variable transmission for large power is substantially 2.5 mm. The value of the displacement $x_8$ is calculated from the elastic deformation quantities of the component parts calculated by an FEM analysis, and it was confirmed through a measurement using an actually assembled toroidal type continuously variable transmission. In the measurement, the outer surfaces (opposed to the power rollers 8) of the outer races 28, 28 (FIGS. 3 to 11) of the thrust ball bearings 26, 26, were blackening, and the toroidal type continuously variable transmission was actually operated. The displacement $x_8$ was confirmed from the contact traces left on the outer surfaces, which result from their contact with the thrust needle roller bearings 27, 27 (FIGS. 3, 4, 10 and 11).

Figure 23:
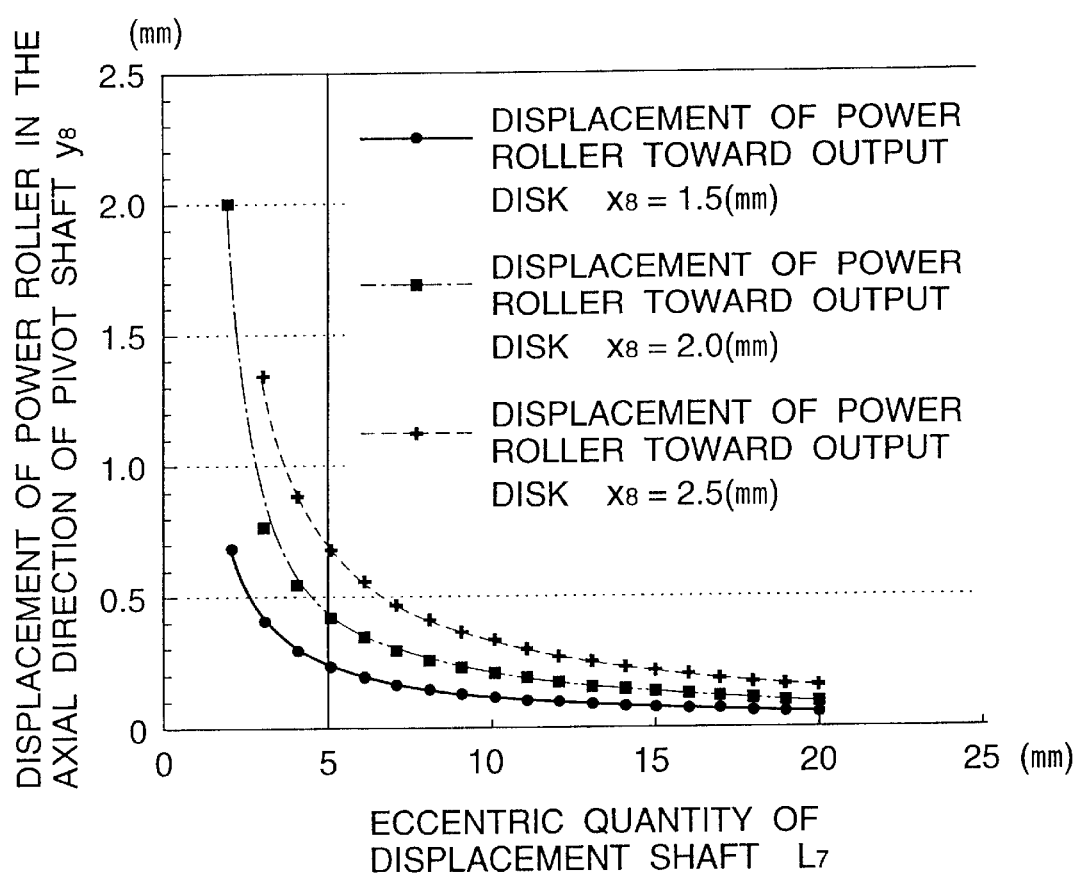
FIG. 23 is a graph showing how the revolution of the pivot shaft according to an eccentric quantity of the displacement shaft affects a displacement of the power roller in the axial direction of the pivot shaft according to a first embodiment of the invention.

The displacement $x_8$ of the power roller 8 toward the output-side disk 4 is 1.5 to 2.5 mm as just mentioned. The quantities of the displacement $y_8$ caused by the displacement $x_8$ was calculated by use of the above equation, and the result of calculations is graphically depicted in FIG. 23. In the graph of FIG. 23, the quantities of the displacement $y_8$ are plotted about three displacements $x_8$ of 1.5 mm, 2.0 mm and 2.5 mm. As seen from the graph, of the displacement $x_8$ being within the range from 1.5 mm to 2.5 mm, the displacement $y_8$ increases when the eccentric quantity $L_7$ is within 7 mm, irrespective of the values of the displacement x8. Particularly when the eccentric quantity $L_7$ is smaller than 5 mm, the displacement $Y_8$ has a large value. From this, it is seen that to reduce the displacement $y_8$, the eccentric quantity $L_7$ is 5 mm or larger, preferably 7 mm or larger.

Figure 2:
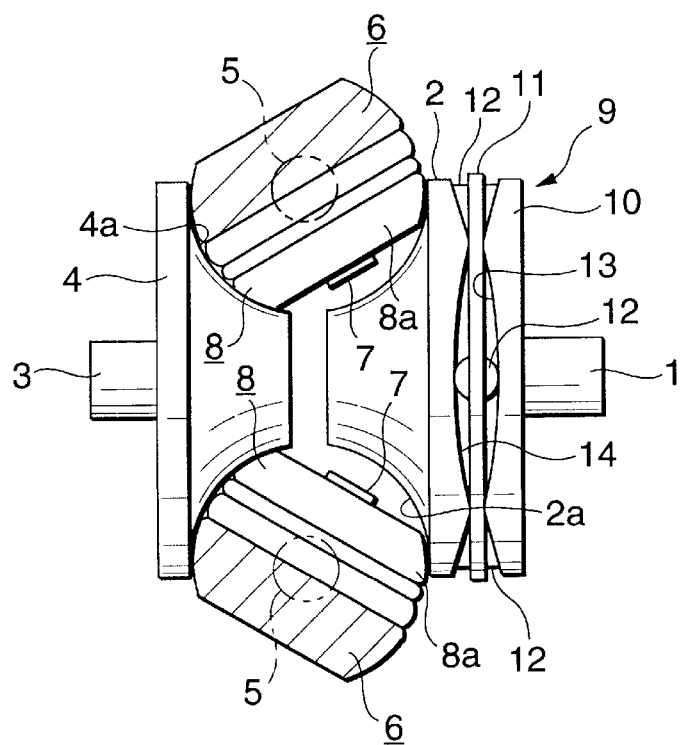
FIG. 2 is a side view schematically showing the basic structure of the toroidal type continuously variable transmission when it is in a maximum acceleration state.
Figure 3:
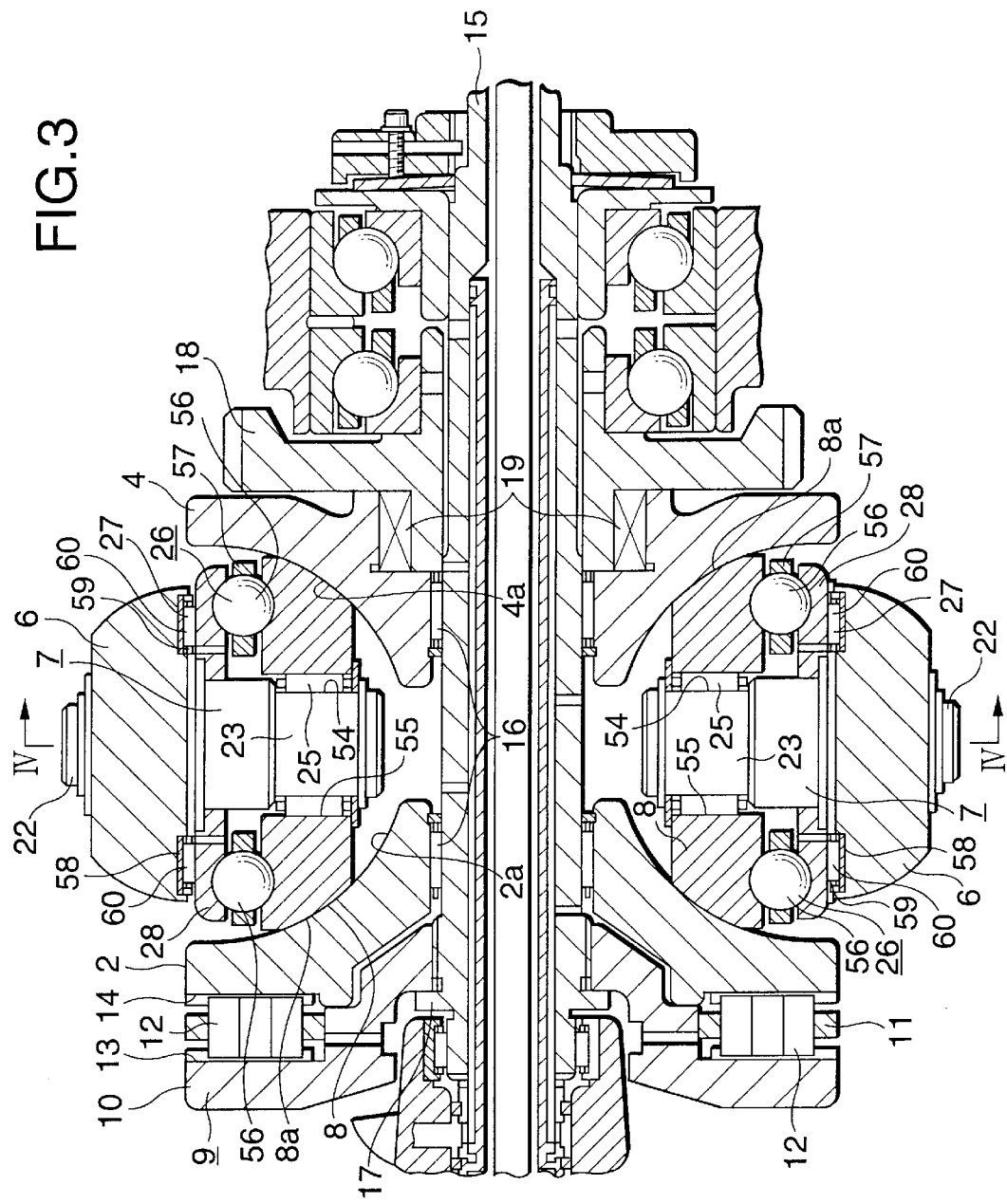
FIG. 3 is a partial cross sectional view showing a specific structure of a conventional first toroidal type continuously variable transmission towards which the invention is directed.

The eccentric quantity $L_7$ affects the rotational speed ratio of the input-side disk 2 (2A, 2B) to the output-side disk 4, in connection with the dimensions of an actual toroidal type continuously variable transmission. Let us calculate the affection of the eccentric quantity. The following preconditions for the calculation were set up: 1) the displacement $x_8$ of the power roller 8 toward the output-side disk 4, based on the dimensional tolerance of the component parts and the elastic deformations of those parts, was 2 mm; 2) a full speed-change-ratio angle as a turn angle of the power roller 8 between a maximum acceleration position (FIG. 1) and a maximum deceleration position (FIG. 2) was 60°; and 3) a cam lead of the precess cam was 45 mm/360° in connection with the turn angle. It is general that the turn angle (full speed-change-ratio angle) of the power roller 8 is selected to be within 50° to 70°, although it depends on the width of the speed change ratio. A test, conducted by the company of the present patent application, showed that a preferable cam lead ranges 40 mm/360° to 60 mm/360°.

With the above conditions, calculation about the affection of the eccentric quantity $L_7$ to the speed change ratio will be made. To calculate, it is assumed that the eccentric quantity $L_7$ is 3 mm. When the power roller 8 is displaced 2 mm in the x-direction, the power roller 8 displaces 0.764 mm in the y-direction with the revolution of the pivot shaft portion 23 about the support shaft portion 22. In this case, a turn angle of the trunnion 6 caused by the y-directional movement, i.e., a speed-change-ratio angle of the power roller 8, is (0.764/45)×360°=6.112°. When this value is compared with 60° of the full speed-change-ratio angle, then we have 6.112°/60°=0.102. This figure teaches that when the pivot shaft portion 23 revolves around the support shaft portion 22 to displace the power roller 8 in the y-direction, the speed-change-ratio angle of the power roller 8 changes by 10.2% of the full speed-change-ratio angle. This figure, 10.2%, is very large, and does not lead to the achievement of a desired speed change ratio performance.

If the eccentric quantity $L_7$ is 10 mm, the power roller 8 moves 0.202 mm in the y-direction under the same conditions as in the above case. A speed-change-ratio angle of the power roller 8 according to the movement is (0.202/45)×360°=1.616°. When this value is compared with the value of the full speed-change-ratio angle, then 1.616°/60°=0.027. This value is much smaller than that in the case of $L_7$=3 mm; a deviation of the speed-change-ratio angle is only 2.7%, and hence it leads to the achievement of a desired speed change ratio performance. Further, if $L_7$=15 mm and $L_7$=20 mm, the displacements $y_8$ of the power roller in the y-direction are 0.134 mm and 0.100 mm, and changing rates of the speed-change-ratio angle are 1.8% and 1.3%. There is no great difference between the calculation result in the case of $L_7$=15 mm and that in the case of $L_7$=20 mm. This fact teaches that increase of the eccentric quantity $L_7$ to a value in excess of 15 mm is insignificant in preserving the speed change ratio performance by suppressing the displacement $y_8$ in the y-direction.

Figure 24A:
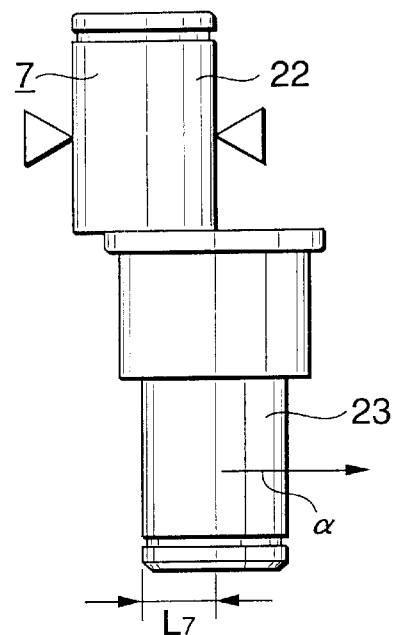
FIGS. 24A and 24B are diagrams showing the displacement shaft when viewed from the axial direction of the input-side disk and the output-side disk, for explaining a force acting on the displacement shaft during the power transmission.
Figure 24B:
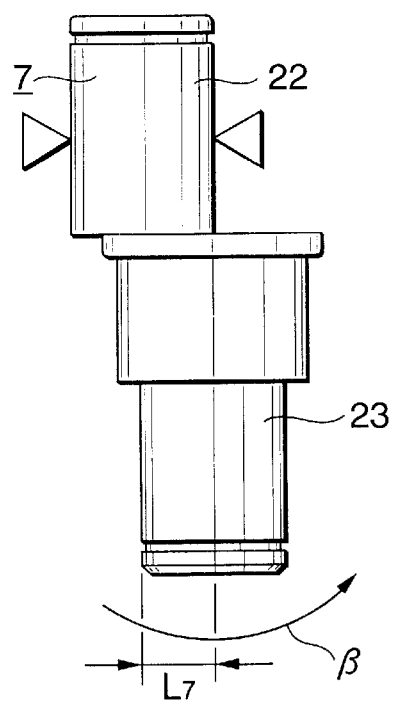
Figure 25:
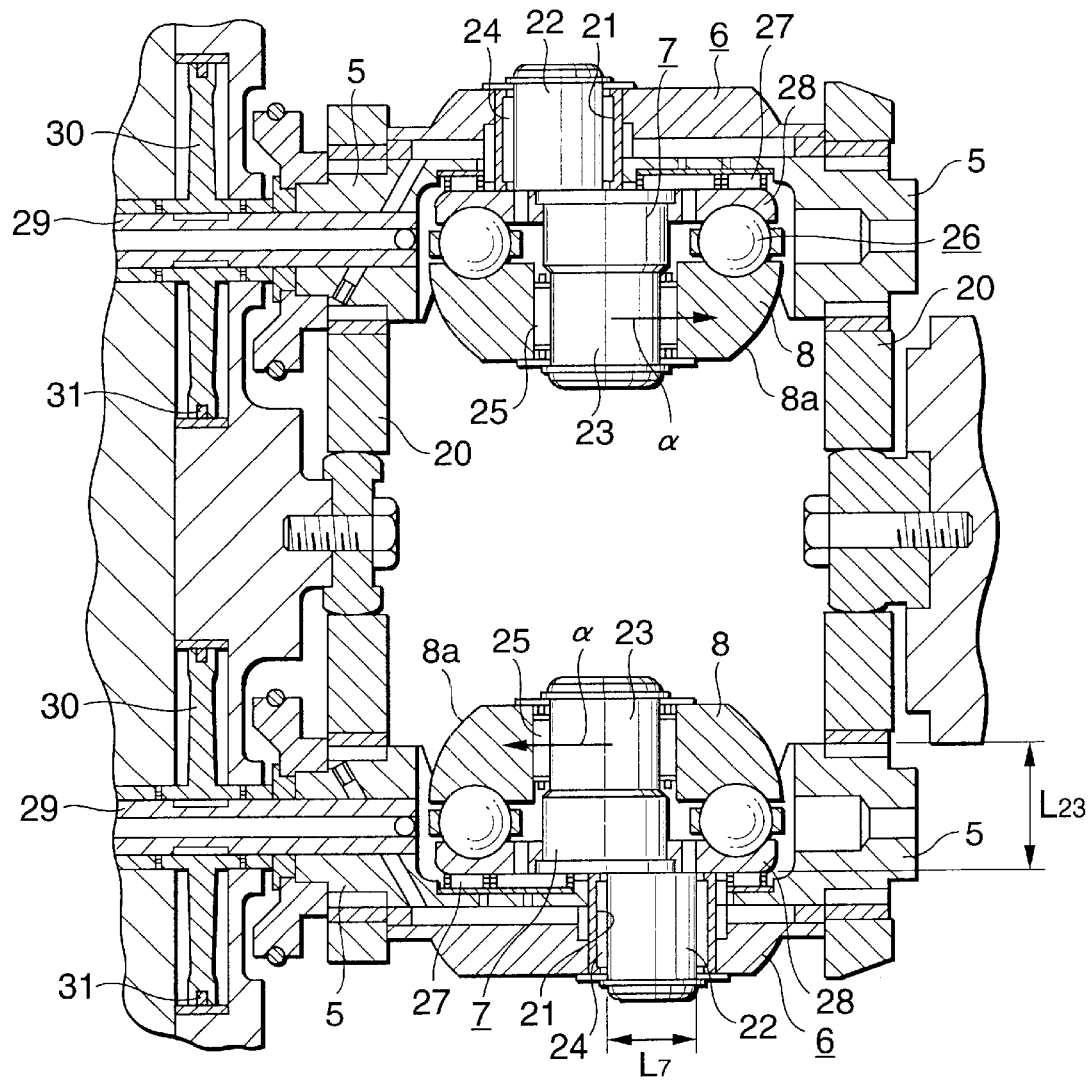
FIG. 25 is a cross sectional view taken on line XXV—XXV in FIG. 8.

Although the reason why the lower limit of the eccentric quantity $L_7$ is set at 5 mm, preferably 7 mm is as mentioned above, the upper limit of the eccentric quantity $L_7$ will be described. The support shaft portion 22 of the displacement shaft 7 is supported by the radial needle roller bearings 24 within the annular holes 21, which is provided in the middle portion of the trunnion 6. The displacement shaft 7 is supported on the trunnion 6 in a cantilever fashion, as shown in FIG. 24A. When the toroidal type continuously variable transmission is in operation, a large force in an arrow direction of α of FIGS. 24A and 25 is applied to the power rollers 8, 8, which is rotatably supported on the pivot shaft portion 23 of the displacement shaft 7, by means of the radial needle roller bearing 25. That is, a force, the direction of which is the rotational direction of the input-side disk 2 (2A, 2B) is applied to the contact portion where the inner surface 2a of the input-side disk 2 (2A, 2B) is in contact with the peripheral surfaces 8a of the power roller 8. A force, the direction of which is opposite to the rotational direction of the output-side disk 4 (i.e., the same as the rotational direction of the input-side disk 2) is applied to the contact portion where the inner surface 4a of the output-side disk 4 is in contact with the peripheral surfaces 8a of the power roller 8. This force is applied, as shown in an arrow direction of β in FIG. 24B, to the center position in the axial direction of the radial needle roller bearing 25 on the center axis of the pivot shaft portion 23, so that the force acts to bend the displacement shaft 7. If the displacement shaft 7 has a low rigidity, the displacement shaft 7 is greatly deformed, and the power roller 8 supported on the displacement shaft 7 is easy to displace in the arrow direction of α (substantially coincident with the y-direction).

On the other hand, a portion of the displacement shaft 7 where the rigidity is the lowest is the joint portion where the support shaft portion 22 is jointed to the pivot shaft portion 23. Increase of the eccentric quantity $L_7$ between the support shaft portion 22 and the pivot shaft portion 23 leads to reduction of the cross sectional area of the joint portion and hence lowering of the rigidity in the joint portion. Where the eccentric quantity $L_7$ is small, the cross sectional area of the joint portion takes the shape of a perfect circle or similar to the same. As the eccentric quantity $L_7$ increases, the cross sectional area becomes elliptical in shape or is shaped like a rugby ball. Thus, with increase of the eccentric quantity $L_7$, the cross sectional area changes its shape from the perfect circle to the ellipse or rugby ball. The moment of inertia of area of the joint portion changes, so that a deformation of the displacement shaft 7, caused by the forces having the directions of α and β, increases in its quantity. The fact that this deformation in the α and β directions is large leads to the fact that the contact points, where the peripheral surface 8a of the power roller 8 is in contact with the inner surface 2a of the input-side disk 2 and the inner surface 4a of the output-side disk 4, are greatly moved in the y-direction. It is desirable to reduce the quantities of the deformation in the α and β directions as small as possible, as well as in the case of the displacement in the y-direction based on the eccentric quantity $L_7$.

Figure 26A:
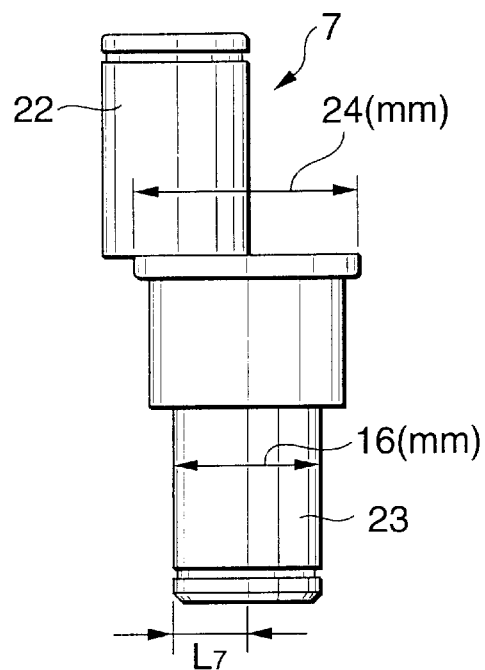
FIG. 26A and 26B are diagrams showing two specific displacement shafts, illustrated for the same purpose as of FIG. 24.
Figure 26B:
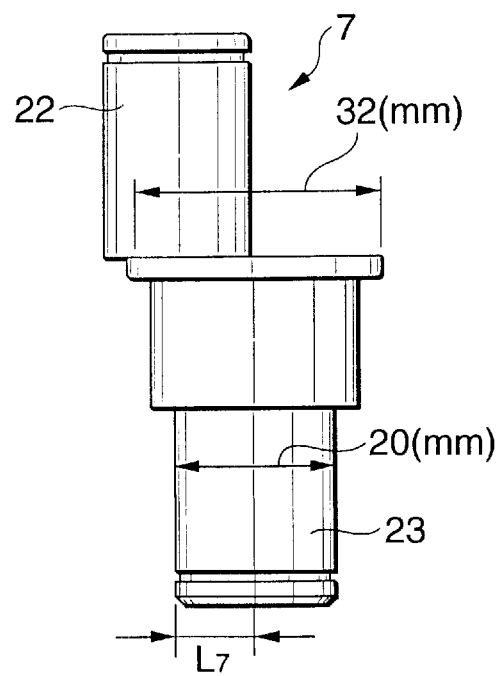

Specific configurations and dimensions of the displacement shaft 7 will be described. To this end, two examples of the displacement shaft 7 are given in FIGS. 26A and 26B. The displacement shaft shown in FIG. 26A is to be assembled into a toroidal type continuously variable transmission for the engine of relatively small power, and the displacement shaft shown in FIG. 26B is to be assembled into a toroidal type continuously variable transmission for the engine of relatively large power. In FIGS. 26A and 26B, numerals indicate the outside diameters (in mm) of portions indicated by dimension lines. FIGS. 27A and 27B show those two displacement shafts each having three different eccentric quantities $L_7$, together with specific values of the cross sectional areas S(mm$^2$) and the moment I of inertial of area of the joint portions, and the deformation quantities λ(mm) of the displacement shaft 7 in the axial direction (y-direction) of the pivot shafts.

The deformation quantity λ of the displacement shaft 7 is expressed by $$\lambda = PL_{23}^3/(3EI)$$

In the above equation, P is a load applied to the displacement shaft 7. The load P corresponds to an automotive power transmitted through the power roller 8, i.e., a traction force. $L_{23}$ is a distance from a point of application to a fulcrum of the load P, viz., the length of an arm, and corresponds the length from the joint portion between the support shaft portion 22 and the pivot shaft portion 23 to the center position of the radial needle roller bearing 25 when viewed in the axial direction. E is Young's modulus of a hard metal, e.g., bearing steel of the displacement shaft, and is 21000 kgf/mm$^2$. The distance $L_{23}$ (from the force application point to the fulcrum) and the force P were 25 mm and 250 kgf for the displacement shaft for the small engine power shown in FIGS. 26A and 27A, and 30 mm and 600 kgf for the displacement shaft 7 for the large engine power shown in FIGS. 26B and 27B.

Figure 28:
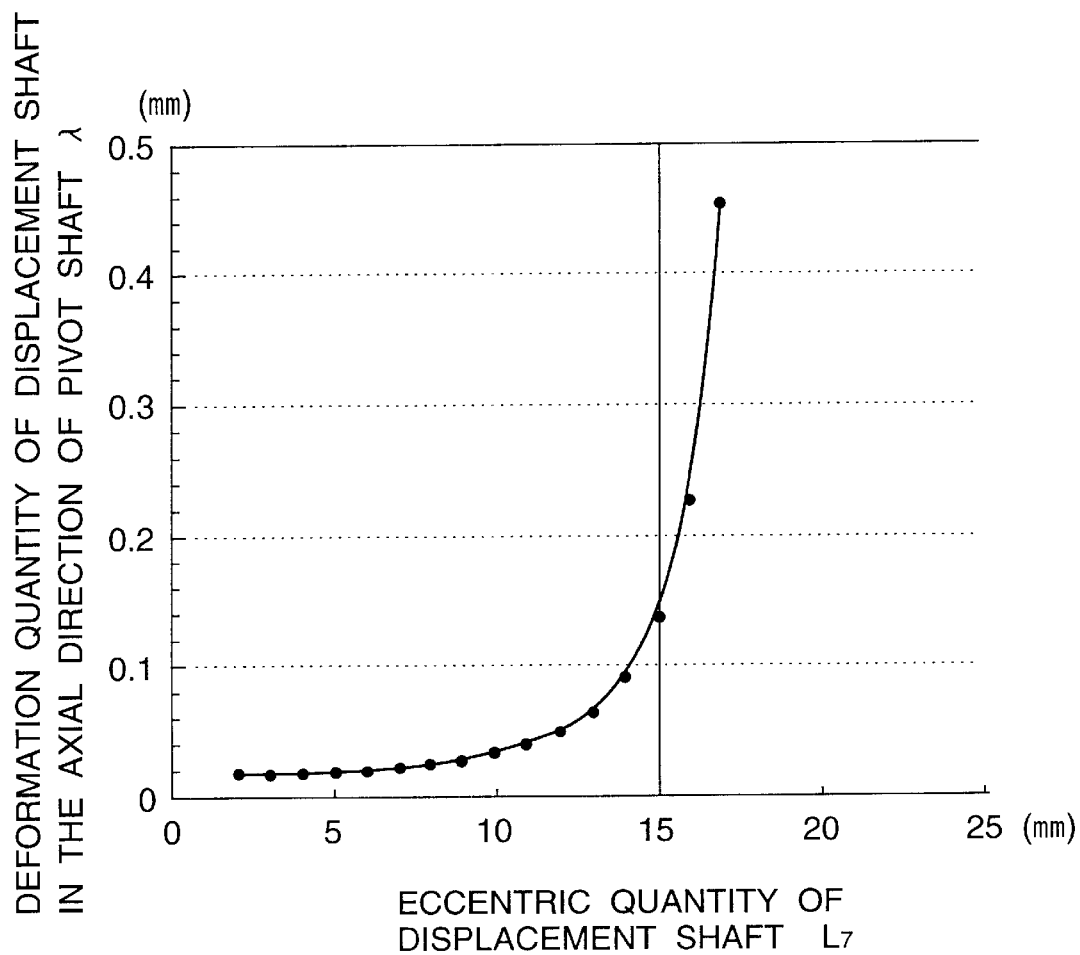
FIG. 28 is a graph showing how the elastic deformation according to the eccentric quantity effects the displacement amount of the displacement shaft in the axial direction of the pivot shaft, relating to the displacement shaft shown in FIG. 26A.
Figure 29:
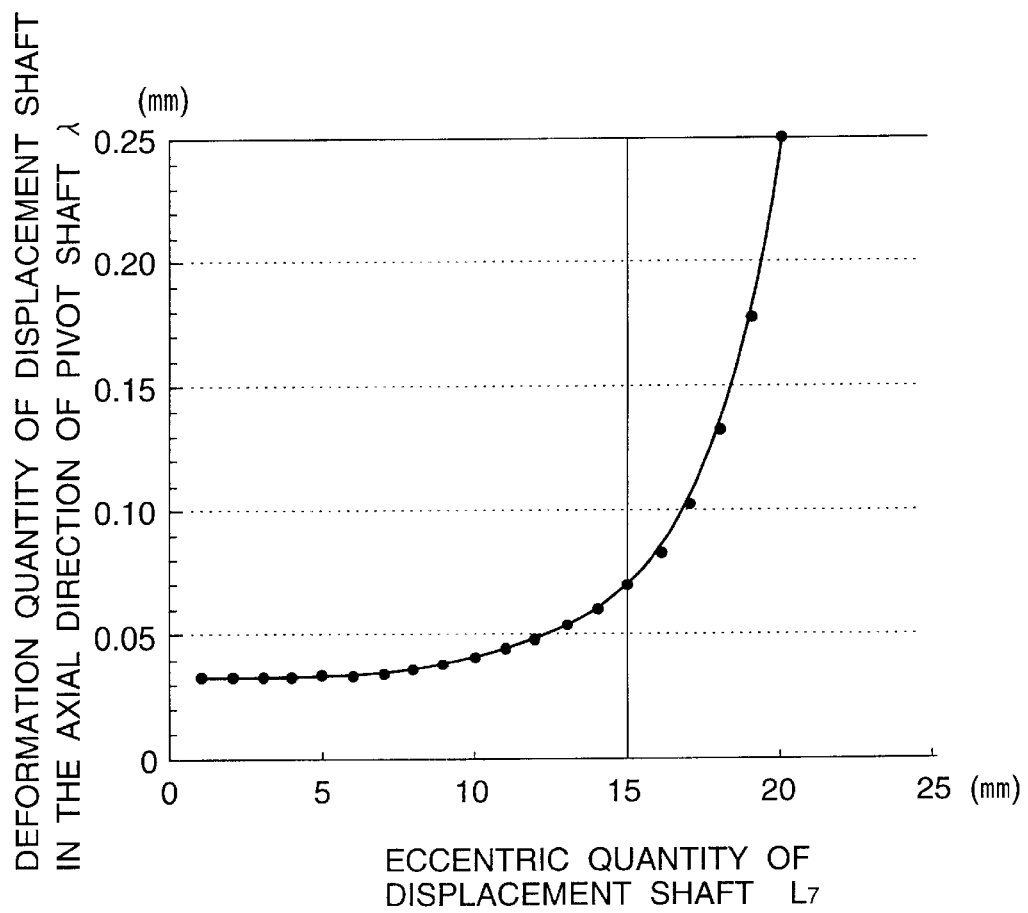
FIG. 29 is a graph showing how the elastic deformation according to the eccentric quantity effects the displacement amount of the displacement shaft in the axial direction of the pivot shaft, relating to the displacement shaft shown in FIG. 26B.

Under the above-mentioned preconditions, calculation was made on the deformation quantity λ of the displacement shaft 7 according to an influence of the eccentric quantity $L_7$. FIG. 28 shows a variation of the deformation quantity λ of the displacement shaft 7 assembled into the toroidal type continuously variable transmission for the small power engine shown in FIG. 26A and 27A with respect to the eccentric quantity $L_7$. FIG. 29 shows a variation of the deformation quantity λ of the displacement shaft 7 assembled into the toroidal type continuously variable transmission for the large power engine shown in FIG. 26B and 27B with respect to the eccentric quantity $L_7$. As seen from FIGS. 28 and 29, a curve representative of a variation of the deformation quantity λ of the displacement shaft 7 rises when the eccentric quantity $L_7$ is 12 mm or longer, irrespective of the size of the displacement shaft 7. When the eccentric quantity $L_7$ is 15 mm or larger, the curve sharply rises. From this fact, it is seen that the upper limit of the eccentric quantity $L_7$ is 15 mm, preferably 12 mm.

From the analysis described above, it is concluded that if the dimensions of the toroidal type continuously variable transmission are within the above-mentioned ones, the eccentric quantity $L_7$ of the pivot shaft portion 23 of the displacement shaft 7 to the support shaft portion 22 thereof is selected to be within a range from 5 mm to 15 mm, irrespective of the magnitude of an automotive power (in particular torque) transmitted by the toroidal type continuously variable transmission, or the size of the displacement shaft 7. Thus, a variation of the speed change ratio, which is due to the dimensional tolerance of the component parts of the continuously variable transmission and elastic deformations caused by thrust loads applied during the power transmission, can be reduced to such a variation level as to create no problem in practical use.

As seen from the foregoing description, in the toroidal type continuously variable transmission constructed as mentioned above, its speed change ratio can be controlled to a desired one, and hence in a motor vehicle having the continuously variable transmission of the invention assembled thereinto, the improvement of running performances and efficient fuel consumption are both achieved.

[Second Embodiment]

Figure 30:
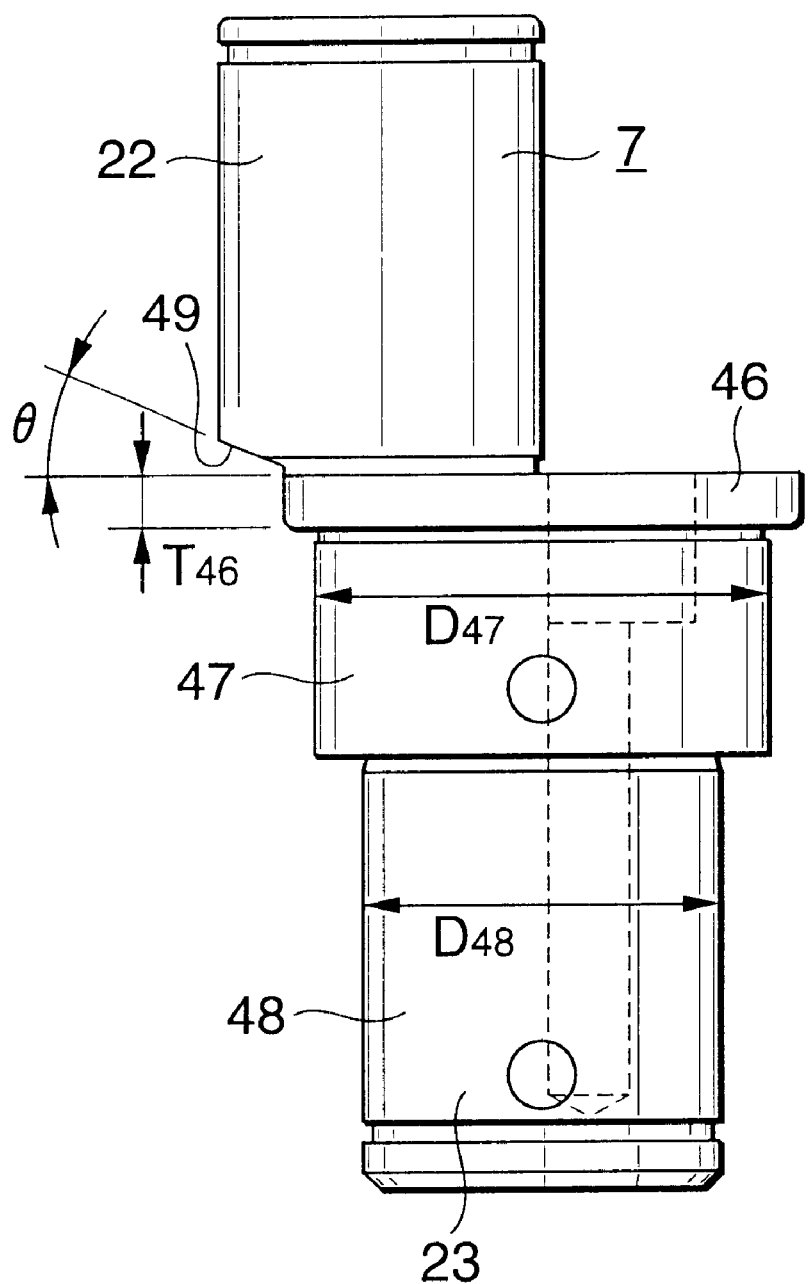
FIG. 30 is a diagram showing second embodiment of a toroidal type continuously variable transmission according to the present invention, in which a displacement shaft is viewed from the same direction as in FIG. 4.
Figure 31:
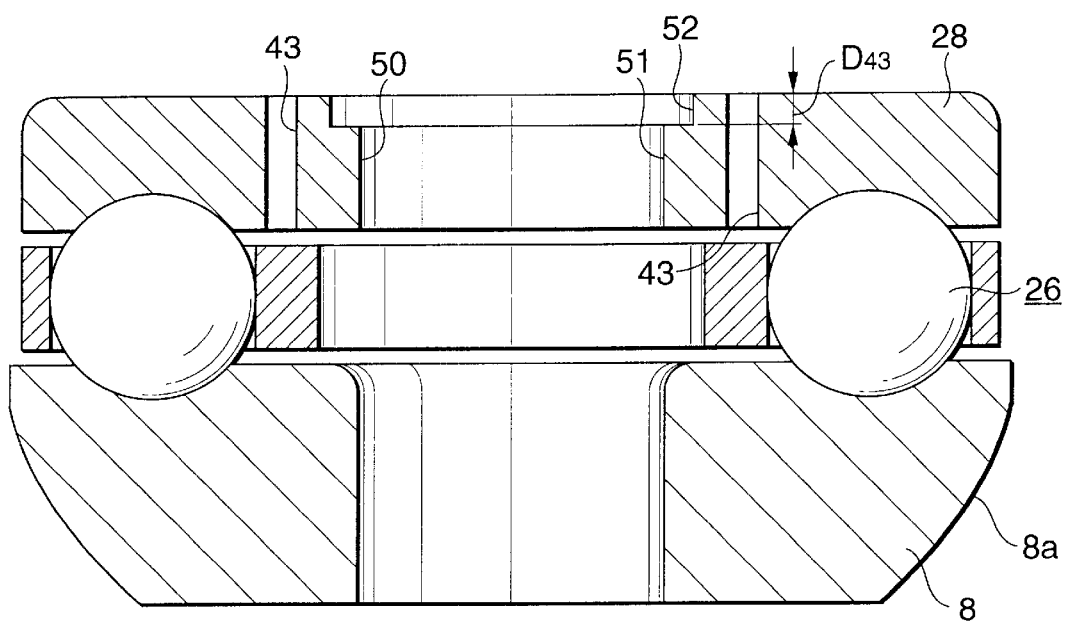
FIG. 31 is a cross sectional view showing a structure including a power roller and a thrust ball bearing according to the second embodiment.
Figure 32:
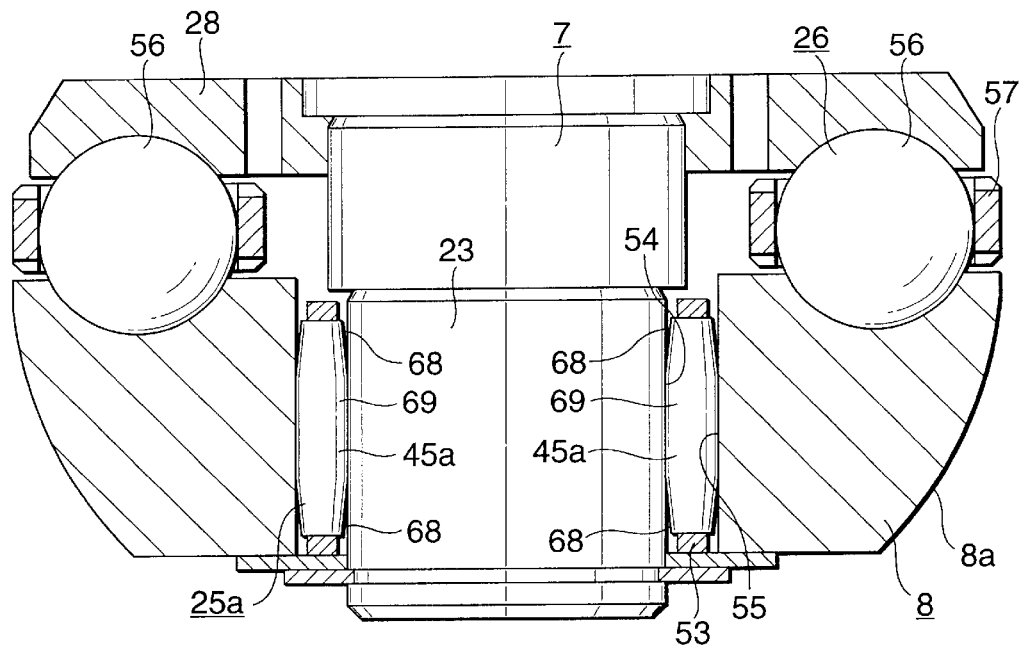
FIG. 32 is a cross sectional view showing a main portion of a third embodiment of the present invention, in which a power roller is in a free state.

Turning now to FIGS. 30 to 31, there is shown a second embodiment of the present invention. In this embodiment to be described hereunder, the invention is directed to the improvement of the displacement shafts 7 for rotatably supporting the power rollers 8 on the trunnions 6 (FIGS. 1 through 7). The remaining structure and operation of the continuously variable transmission are substantially the same as of the conventional or proposed toroidal type continuously variable transmission already described. For this reason, a description and illustration of the similar structure will be omitted or simply given, and a feature of the invention and a portion except for the above explained will be given.

As shown, the displacement shaft 7 includes a support shaft portion 22 and a pivot shaft portion 23, which are parallel to each other but the former is eccentric from the latter. A flange portion 46 is formed at a continuous portion where the support shaft portion 22 and the pivot shaft portion 23 are continuous. The outside diameter $D_{47}$ of a base-side half part 47 of the pivot shaft portion 23, located closer to the flange portion 46, is larger than the outside diameter $D_{48}$ of the tip-side half part 48 of the same ($D_{47} > D_{48}$). When the outside diameter $D_{47}$ of the base-side half part 47 of the pivot shaft portion 23 is increased, the following advantages are produced. The cross section area of the continuous portion between the support shaft portion 22 and the pivot shaft portion 23 is secured in a satisfactory level. A bending rigidity of the continuous portion is increased. Therefore, the displacement shaft 7 is hard to bend at this continuous portion during the operation of the continuously variable transmission, and the displacement shaft 7 is less deformed when it is subject to heat treatment.

Further, in the base surface of the support shaft portion 22, i.e., its base surface located closer to the flange portion 46, there is formed a chamfered part 49 which is chamfered at a portion outwardly protruding from the outer peripheral surface of the flange portion 46 of the base surface in the radial direction of the support shaft portion 22. The chamfered part 49 prevents the interference with the outer race 28 of the thrust ball bearing 26 which supports the power roller 8, and provides a smooth surface of the continuous portion between the support shaft portion 22 and the flange portion 46. The smooth surface eliminates deformation of the displacement shaft 7 during its heat treatment. An inclination angle θ of the chamfered part 49 is preferably within a range from 10 to 45°.

On the other hand, there is formed a center hole 50 in the central portion of the outer race 28 of the thrust ball bearing 26 for supporting the power roller 8, which is rotatably supported by the displacement shaft 7 as mentioned above. The center hole 50 can receive the flange portion 46 and the base-side half part 47 in a fitting fashion without the rattling therebetween. The center hole 50 includes a small-diameter portion 51 for receiving the base-side half part 47 fittingly, and a large-diameter portion 52 for receiving the flange portion 46 fittingly. The depth $D_{52}$ of the large-diameter portion 52 is slightly larger than the thickness $T_{46}$ of the flange portion 46 ($D_{52}>T_{46}$). With such dimensional selection, a part of the flange portion 46 is not protruded out of the outer surface (upper surface in FIG. 31) of the outer race 28 when the flange portion 46 and the base part 47 are fit into the center hole 50. This is needed in order to prevent the flange portion 46 from interfering with the thrust needle roller bearing 27 (FIGS. 3 through 7), which is located between the outer race 28 and the inner surface of the trunnion 6.

The power roller 8 is rotatably supported on the tip-side half part 48 of the pivot shaft portion 23 of the thus configured displacement shaft 7 by means of the radial needle roller bearing 25 (FIGS. 4 through 7). A portion of the outer circumferential surface of the tip-side half part 48, that is, in the outer circumferential surface of the pivot shaft portion 23, a rolling surface of thereof with which the rolling surfaces of the needle rollers 45, 45 (shown in FIGS. 3 to 7, and FIGS. 14 and 15) of the radial needle roller bearing 25 are brought into contact is smoothed to have a surface roughness of 0.2 μmRa or less, by superfinishing. Grinding finishing, not superfinishing, can produce within 0.2 μmRa (surface roughness); however, grinding technique is difficult, and its cost is high. In this respect, use of the surperfinishing is preferable. The displacement shaft 7 is made of steel, for example, chromium-molybdenum steel (e.g., SCM 435 (JIS G 4105)) or high-carbon-chromium bearing steel (e.g., SUJ 2 (JIS G4805)) A carbonitriding layer containing 0.8 to 1.5 wt % of carbon and 0.05 to 0.5 wt % of nitrogen is formed on a surface portion (actually, the entire surface of the displacement shaft 7) of the outer peripheral surface of at least the lower part 48 of the displacement shaft 7 made of steel. Following the carbonitriding process, at least the surface portion (actually the entire surface of the displacement shaft 7) is quenched and tempered, so as to increase the hardness of the surface portion to HRc60 or higher.

In the thus constructed toroidal type continuously variable transmission, an oil film is easy to form on the contact portion where the outer peripheral surface of the lower part 48 of the pivot shaft portion 23 is in contact with the rolling surfaces of the needle rollers 45, 45 of the radial needle roller bearing 25. And, the formed oil film prevents damages (e.g., early flaking) of the outer peripheral surface of the tip-side half part 48. Table 1 shows the results of an endurance test, conducted by the inventor(s). The test was conducted to know how the surface roughness of the outer peripheral surface of the tip-side half part 48 affects the lifetime of the outer peripheral surface thereof. Samples 1 to 8 were tested under the same conditions which are other than the surface roughness of the outer peripheral surface of the tip-side half part 48; the material, carbon density, and nitrogen density are the same as of sample 4 in Table 2 to be given later, and surface hardness is HRc62.

TABLE 1

| No. | Surface roughness of the outer surface of the tip-side half part [μmRa] | super-finishing | Test result | Judge-ment |
|---|---|---|---|---|
| 1 | 1.0 | no | Rolling surface/needle outer surface flaked after 10 hr | X |
| 2 | 0.6 | no | Rolling surface flaked after 71 hr | X |
| 3 | 0.6 | no | Rolling surface/needle outer surface flaked after 64 hr | X |
| 4 | 0.5 | no | Rolling surface flaked after 111 hr | X |
| 5 | 0.4 | yes | Rolling surface flaked after 209 hr | X |
| 6 | 0.2 | yes | No problem after 250 hr | ○ |
| 7 | 0.2 | yes | No problem after 250 hr | ○ |
| 8 | 0.1 | yes | No problem after 250 hr | ○ |

The test results show that the outer surface of the lower part 48 is not damaged (not suffered from early flaking, for example) if the outer surface is superfinished to have 0.2 μmRa or less in surface roughness. The surface roughness of the surface other than the tip-side half part 48 does not need to finish smoothly as that of the tip-side half part 48. Approximately 1.6 μmRa is satisfactory for the surface roughness of its outer surface since the support shaft portion 22 is just supported on the trunnion 6 so as to allow its slight pivoting displacement.

Since the carbonitriding layer is formed on the surface portion of the outer peripheral surface of at least the tip-side half part 48 of the pivot shaft portion 23, its heat resistance is high enough to prevent the outer peripheral surface from suffering from early flakes. To know how the carbon and nitrogen contents (densities) of the carbonitriding layer formed in the surface portion of the lower part 48 affects the lifetime of the outer peripheral surface, an endurance test was conducted. The test results are shown in Table 2. In testing samples 1 to 7, other conditions than the carbon and nitrogen contents (densities) of the carbonitriding layer formed in the outer peripheral surface of the tip-side half part 48 were equal; the finished sample 6 in Table 1 was used.

TABLE 2

| No. | Material | Carbon density % | Nitrogen density % | Test results | Judge-ment |
|---|---|---|---|---|---|
| 1 | SCM420 | 0.78 | 0.21 | Flakes after 171 hr | X |
| 2 | SCM435 | 0.96 | 0.02 | Flakes after 201 hr | X |
| 3 | SCM435 | 0.83 | 0.25 | No problem after 250 hr | ○ |
| 4 | SCM420 | 1.08 | 0.06 | No problem after 250 hr | ○ |
| 5 | SUJ2 | 1.41 | 0.46 | No problem after 250 hr | ○ |
| 6 | SUJ2 | 1.00 | 0.00 | Flakes after 163 hr | X |
| 7 | SUJ2 | 1.53 | 0.32 | Flakes after 142 hr | X |

The toroidal type continuously variable transmission thus constructed succeeds in preventing the peripheral surfaces of the pivot shaft portions of the displacement shafts for supporting the power rollers to the trunnions from damaging, e.g., flaking in early stage. Therefore, the durability and reliability of the continuously variable transmission are improved.

[Third Embodiment]

A third embodiment of the present invention will be described with reference to FIGS. 32 to 35. In the embodiment, the present invention is directed to the improvement of the radial needle roller bearings 25a for rotatably supporting the power rollers 8 on the periphery of the pivot shaft portions 23 constituting the displacement shafts 7 in a toroidal type continuously variable transmission. The remaining structure and operation of the continuously variable transmission are substantially the same as of the conventional or proposed toroidal type continuously variable transmission already described. For this reason, a description and illustration of the similar structure will be omitted or simply given. The description of the embodiment will be made placing emphasis on its feature.

Each radial needle roller bearing 25a is constructed with a plurality of needle rollers 45a, 45a and a cage-like window type retainer 53 for retaining rollably those needle rollers 45, 45. In this case, the outer circumferential surface of the pivot shaft portion 23 serves as the cylindrical inner raceway 54 of the radial needle roller bearing 25, and the inner circumferential surface of the power roller 8 serves as the outer raceway 55 of the radial needle roller bearing 25.

Figure 35:
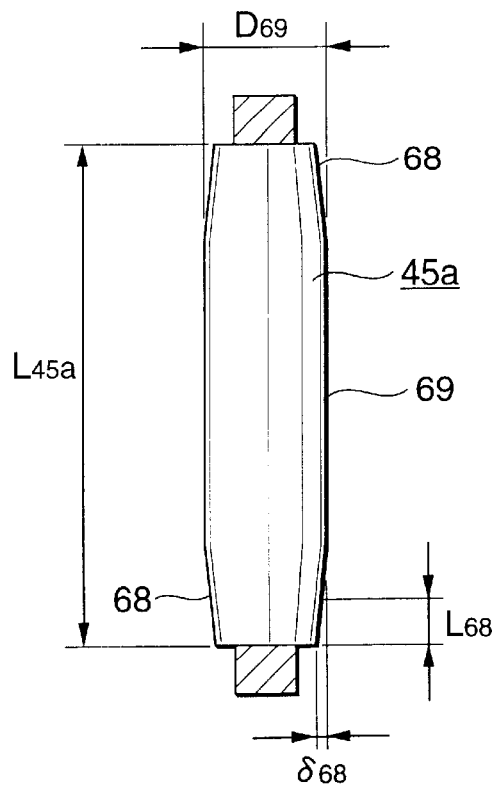
FIG. 35 is a cross sectional view showing a needle roller of a radial needle roller bearing.

In case of the toroidal type continuously variable transmission, as well shown in FIG. 35, both ends of the needle roller 45a (when viewed axially) are tapered to have crownings 68, 68. A crowning quantity $\delta_{68}$ of the needle roller 45a, viz., a distance (radially ranges) of the outer surface of the crowning 68 from the outer circumferential surface of the needle roller 45a (assumed by extending straight from the outer surface of the cylindrical portion 69, which is provided in the center portion of the needle roller 45a in the axial direction thereof), is determined in the following way. It is assumed that the axial length of the needle roller 45a is $L_{45a}$, the outer diameter of the cylindrical portion 69 is $D_{69}$, and a distance from each end face of the needle roller 45a to a measuring point of the crowning quantity $\delta_{69}$ is $L_{68}$. Further, it is assumed that the distance $L_{68}$ to the measuring point is selected to be 5 to 15% of the axial length $L_{45a}$; $L_{45a}=(0.05$ to $0.15)\times L_{45a}$. Under this conditions, the crowning quantity $\delta_{68}$ is selected to be 0.15 to 0.65% of the outer diameter $D_{69}$ of the cylindrical portion 69; $\delta_{68}=(0.0015$ to $0.0065)\times D_{69}$.

In the toroidal type continuously variable transmission of the embodiment, the needle rollers 45a of radial needle roller bearing 25a for rotatably supporting the power roller 8 to the pivot shaft portions 23 of the displacement shafts 7 are crowned (designated by numeral 68) with a proper crowning quantity. Therefore, even when the power rollers 8 receives large thrust loads during the operation of the continuously variable transmission and are elastically deformed, and as a result, the space width between the inner raceway 54 and the outer raceway 55 of the radial needle roller bearing 25a loses its uniformity, the crowning of the needle rollers 45a effectively prevents excessive area pressure from being applied to the component parts of the radial needle roller bearing 25a.

Figure 33:
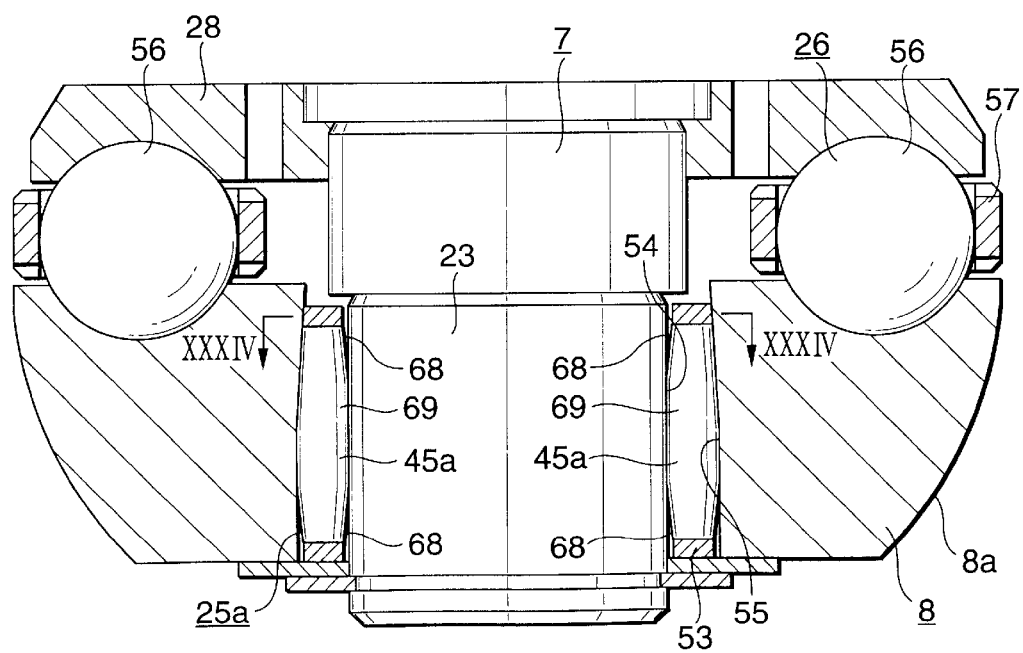
FIG. 33 is a cross sectional view showing the power roller being elastically deformed according to the third embodiment.
Figure 34:
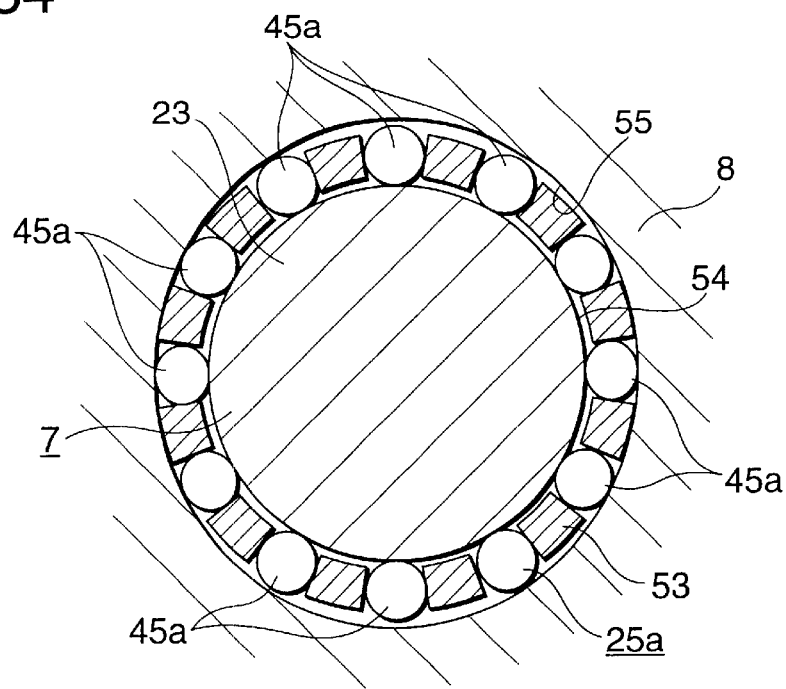
FIG. 34 is a cross sectional view taken on line XXXIV—XXXIV in FIG. 33.

That is, during the operation of the toroidal type continuously variable transmission, the power roller 8 receives large thrust forces at two positions thereon, radially opposite to each other, from the inner surface 2a of the input-side disk 2 and the inner surface 4a of the output-side disk 4 (shown in FIGS. 1 to 3, 8, 9, 19 and 20), and elastically deforms as exaggeratedly illustrated in FIGS. 33 and 34. However, even if the power roller 8 is thus elastically deformed to lose the uniformity of the space width between the inner raceway 54 and the outer raceway 55, the ends of the needle rollers 45a do not come in contact with the inner raceway 54 and the outer raceway 55. Accordingly, the continuously variable transmission of the embodiment is prevented from the early flaking caused by the edge load.

As described above, both ends of each needle roller 45a (when viewed axially viewed) of the radial needle roller bearing 25a are properly crowned (designated as numeral 68). The crowning prevents the occurrence of the edge loading, to thereby improve the durability of the radial needle roller bearing 25a. When the outer raceway 55 structured by the inner circumferential surface of the power roller 8 is elastically deformed, the needle rollers 45a retained by the retainers 53 somewhat change their attitude, so that the rolling surfaces of the needle rollers 45a, 45 provide the inner raceway 54 and the outer raceway 55. Contact of the rolling surfaces of the needle rollers 45a, 45a with the inner raceway 54 and the outer raceway 55 is put in a proper contact state, to thereby suppress an excessive increase of the area pressure on the contact portions.

In this connection, when the crowning quantity $\delta_{68}$ is too small, generation of the edge load is insufficiently suppressed. In this case, the durability of the radial needle roller bearing 25a is insufficiently improved. On the contrary, when it $\delta_{68}$ is too large, the needle rollers 45a, 45a of the radial needle roller bearing and the power roller 8 supported by the radial needle roller bearing 25a are slanted. The result has an opposite effect that the edge load is easy to generate and the early flaking is easy to occur. In addition, since the power roller 8 transmits the automotive power while rotating at high speed in a state that the power roller 8 is slanted compared with the normal attitude, to thereby generate large sound and vibrations. The whole transmission with the transmission unit containing the toroidal type continuously variable transmission generates large sound and vibrations, and thus, this adversely affects the drive feeling of the vehicle having the transmission unit.

On the other hand, in the present invention, the crowning quantity ($\delta_{68}$ is controlled as described above, and hence the generation of the edge load is not prevented, and the power rollers 8 are not slanted during the operation of the continuously variable transmission.

A test conducted by the inventor(s) to set the crowning quantity $\delta_{68}$ as described above will be described. High speed endurance tests was performed by use of a motor dynamo for two toroidal type continuously variable transmissions for small engine power and for large engine power.

Figure 4:
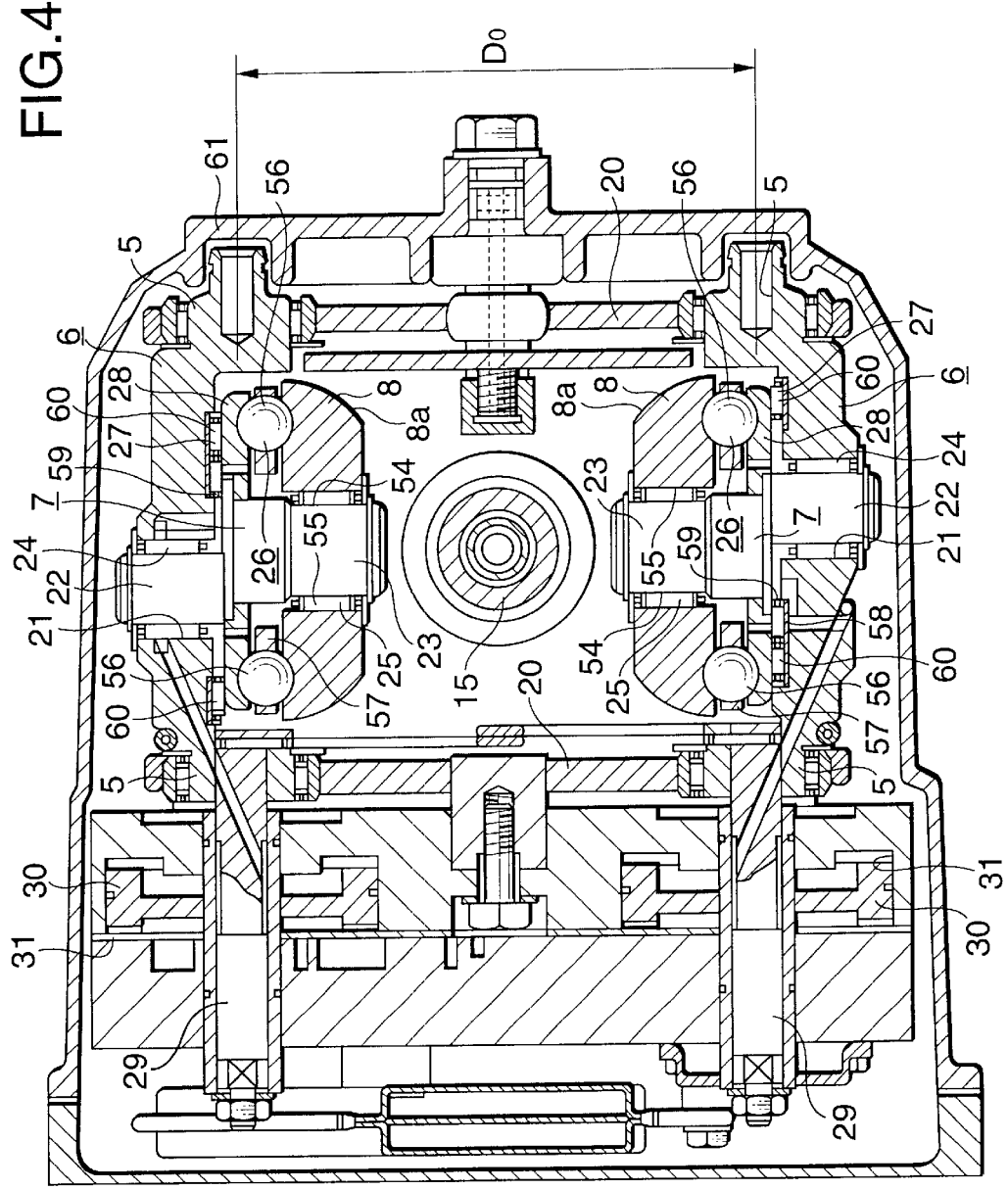
FIG. 4 is a cross sectional view taken on line IV—IV in FIG. 3.
Figure 5:
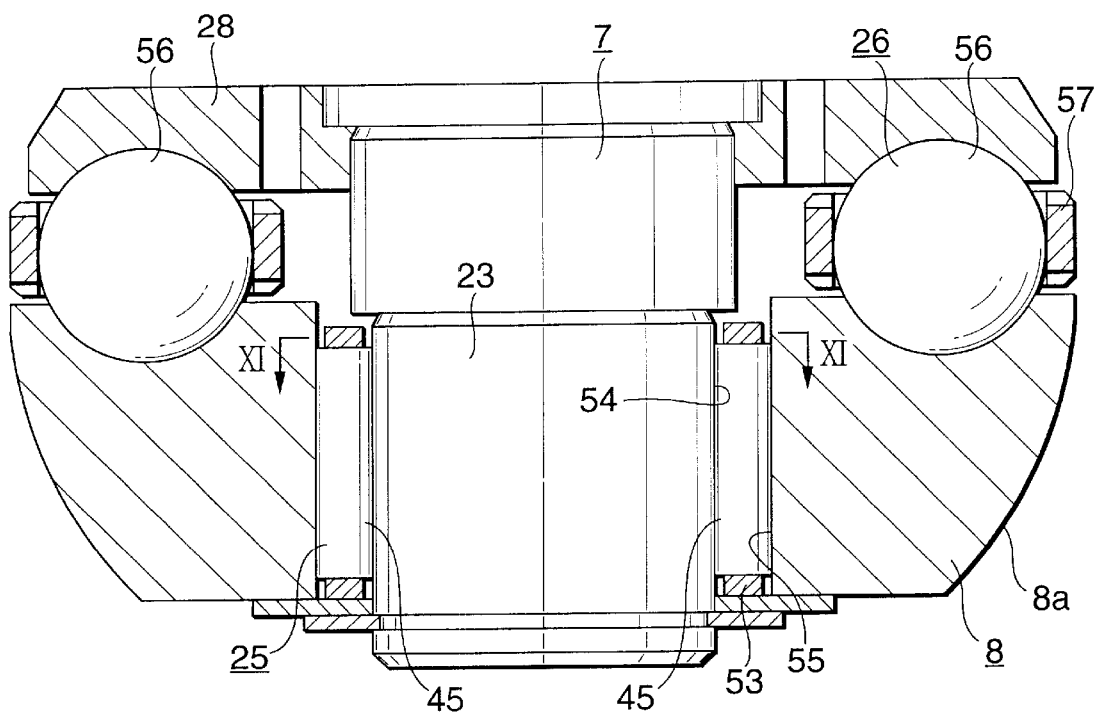
FIG. 5 is a cross sectional view showing a main portion of the conventional toroidal type continuously variable transmission in which power rollers are in a free state.
Figure 6:
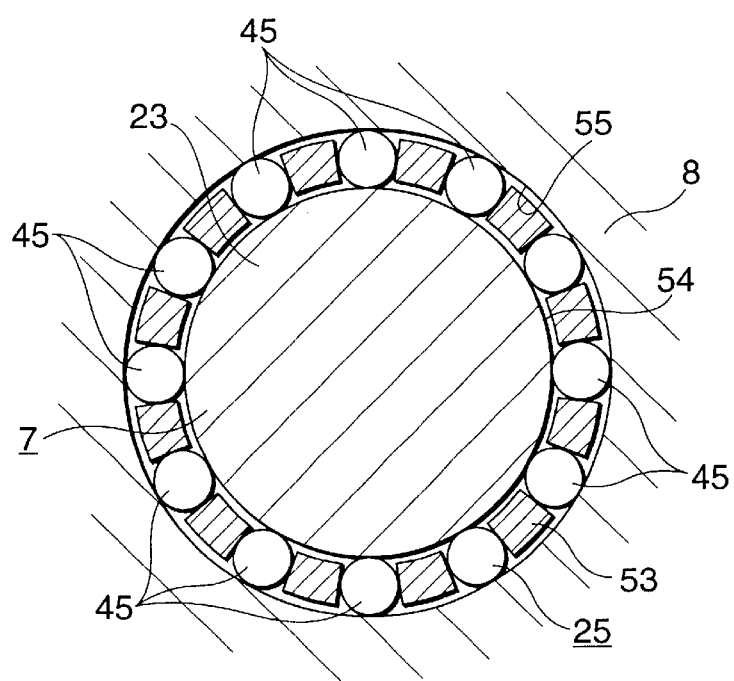
FIG. 6 is a cross sectional view taken on line XI—XI in FIG. 5.
Figure 7:
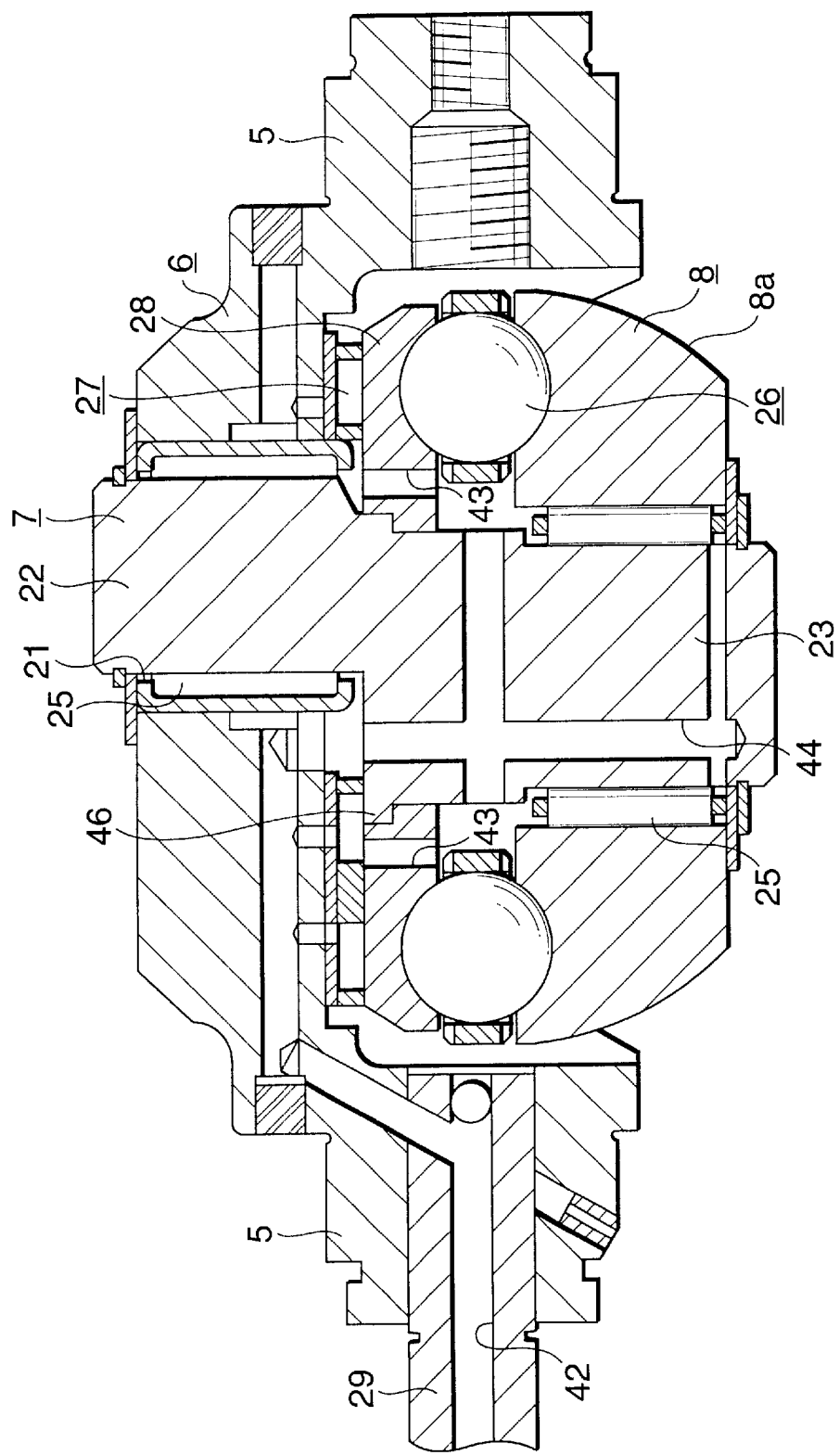
FIG. 7 is a cross sectional view showing a main portion incorporating a lubricating-oil supplying path thereinto.
Figure 8:
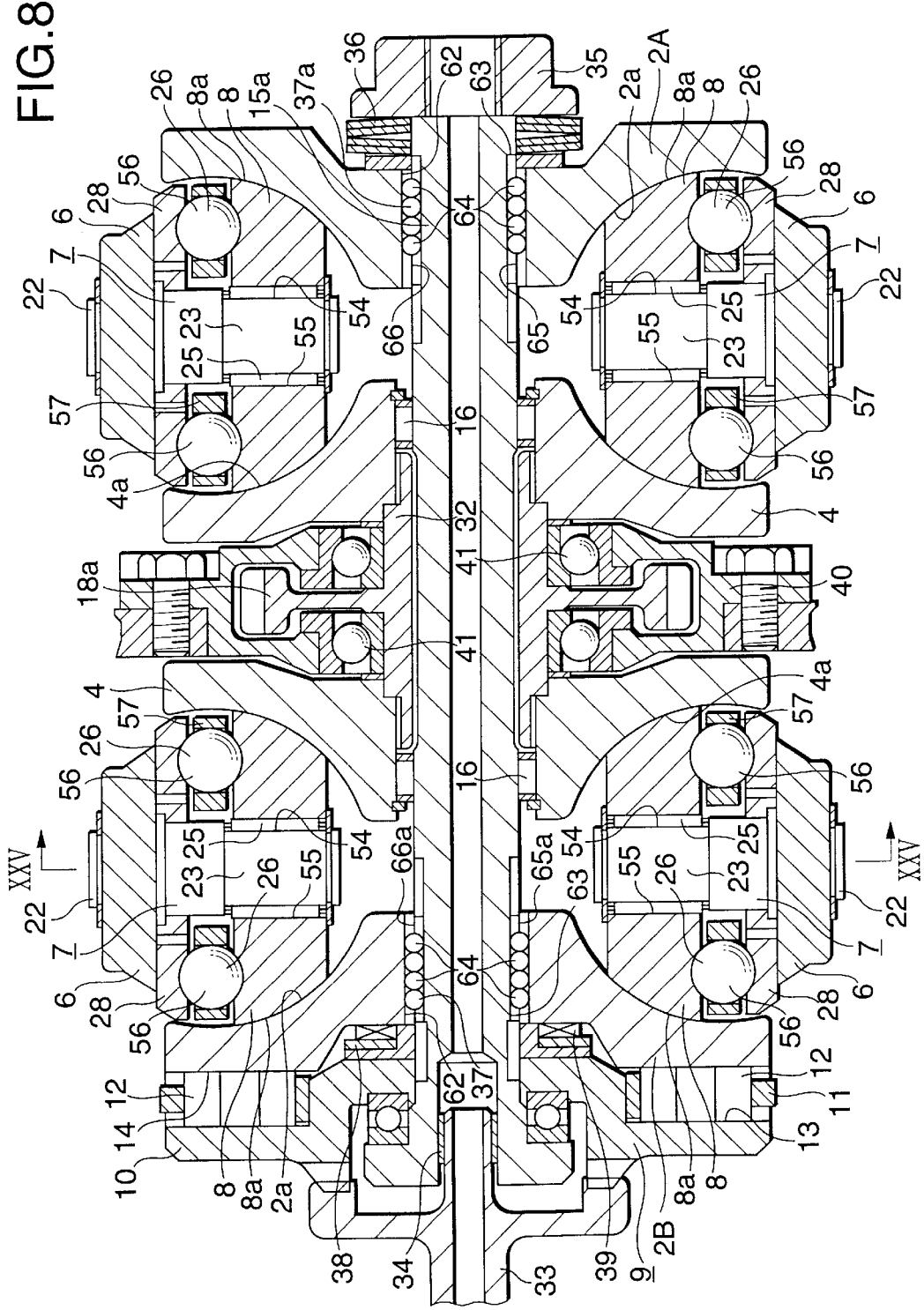
FIG. 8 is a partial cross sectional view showing a specific structure of a conventional second toroidal type continuously variable transmission towards which the invention is directed.
Figure 9:
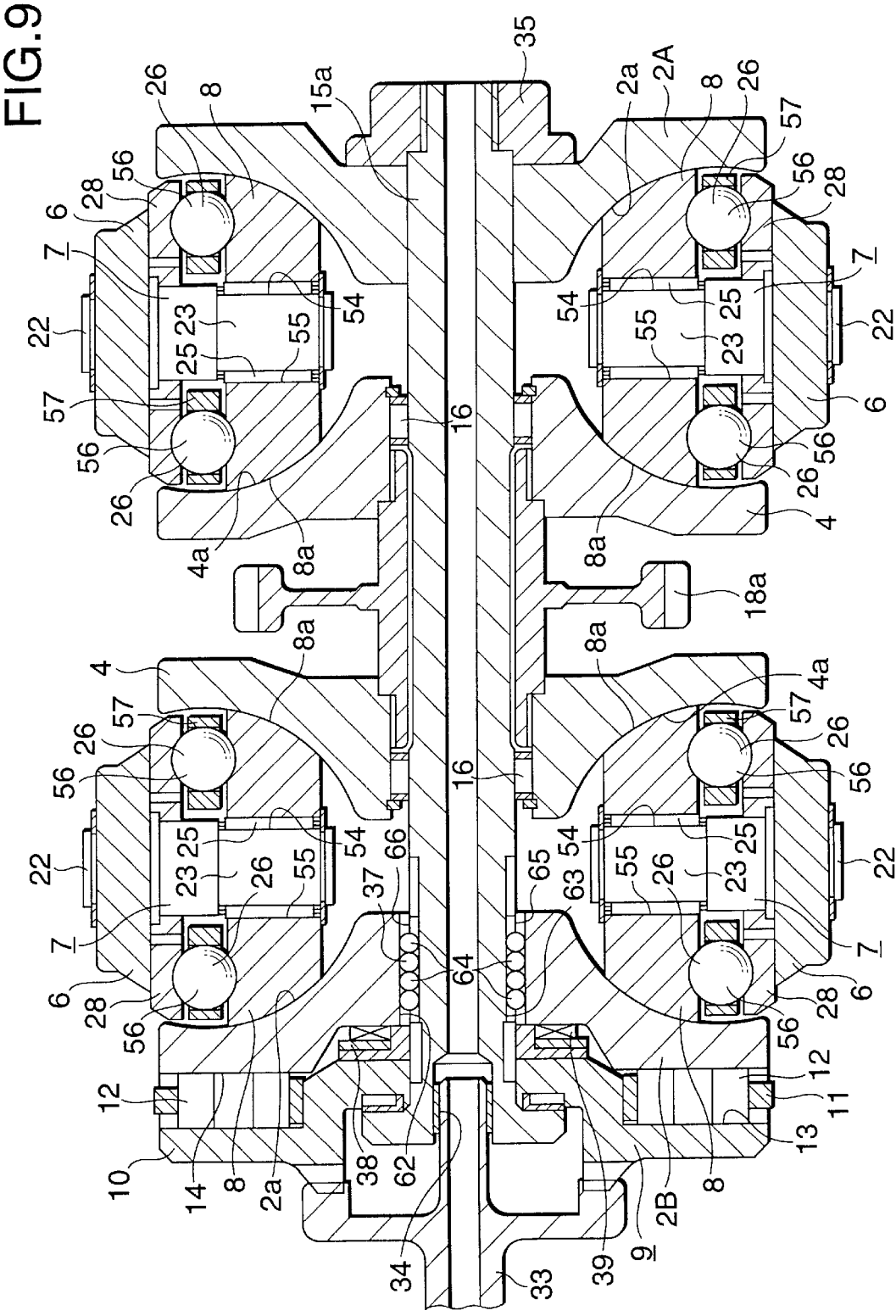
FIG. 9 is a partial cross sectional view showing a specific structure of a conventional third toroidal type continuously variable transmission towards which the invention is directed.
Figure 10:
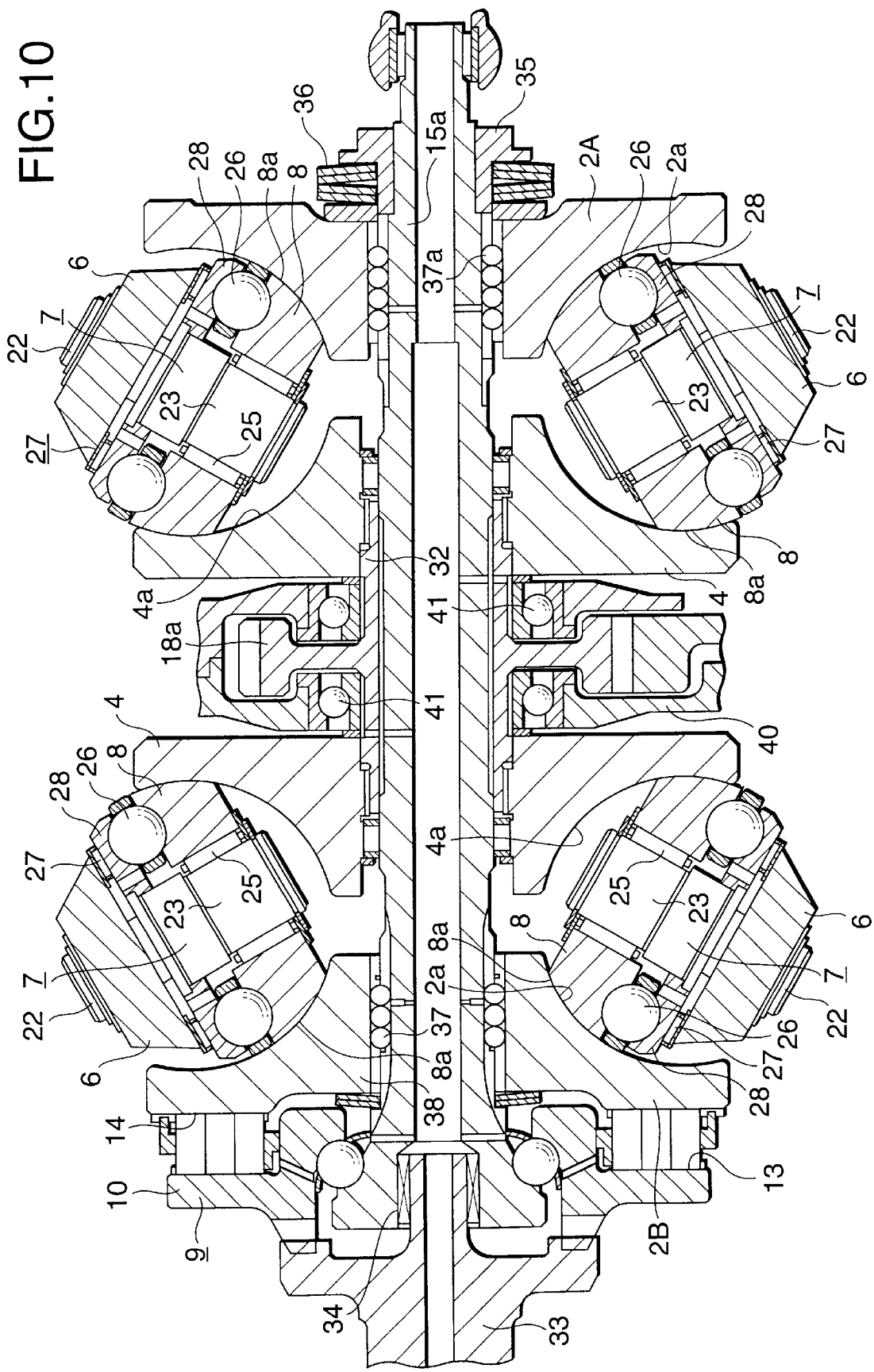
FIG. 10 is a cross sectional view schematically showing the toroidal type continuously variable transmission of FIG. 8 when it is in a maximum deceleration state.
Figure 11:
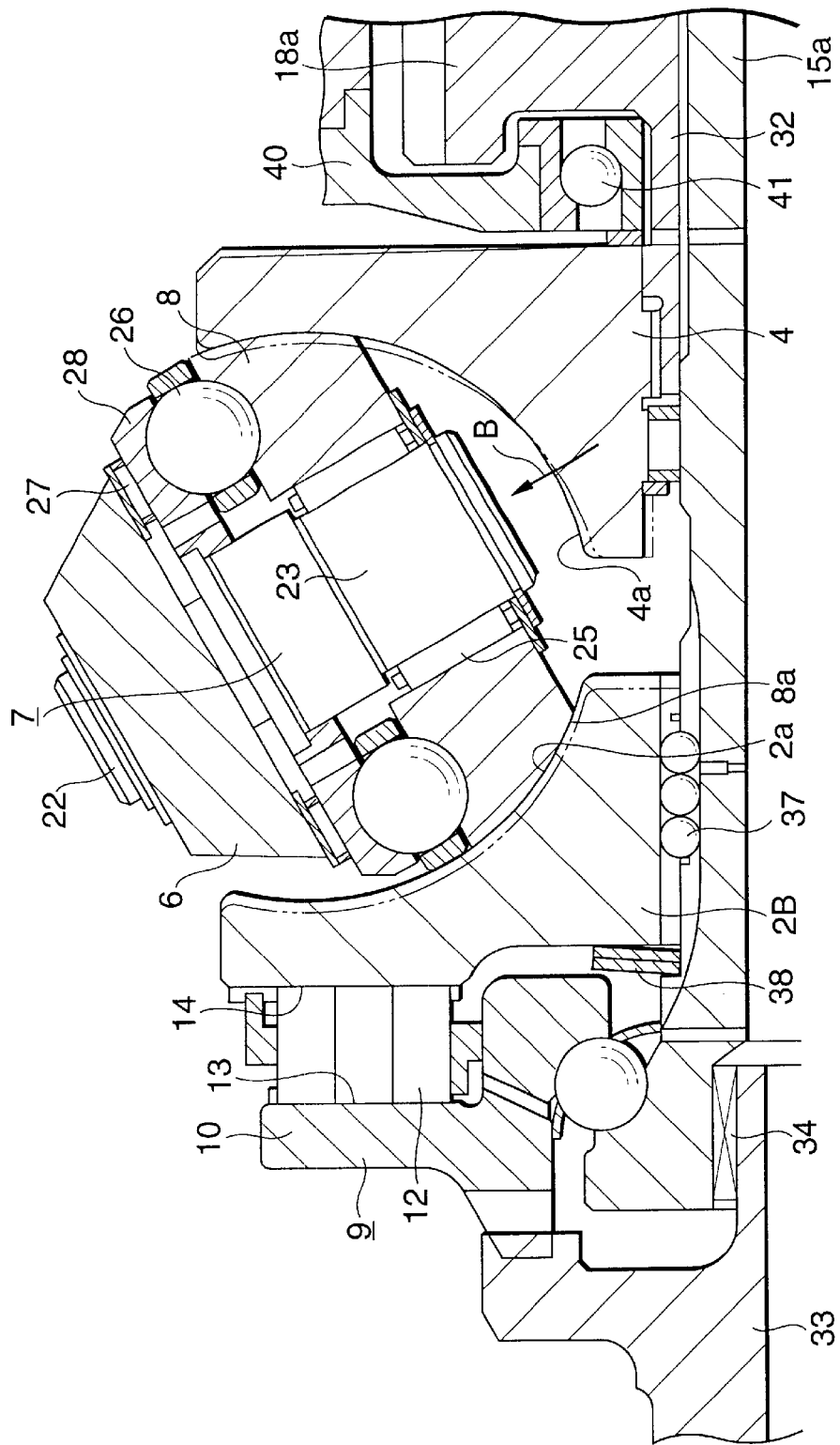
FIG. 11 is an enlarged view showing an upper-left portion of FIG. 10.
Figure 12A:
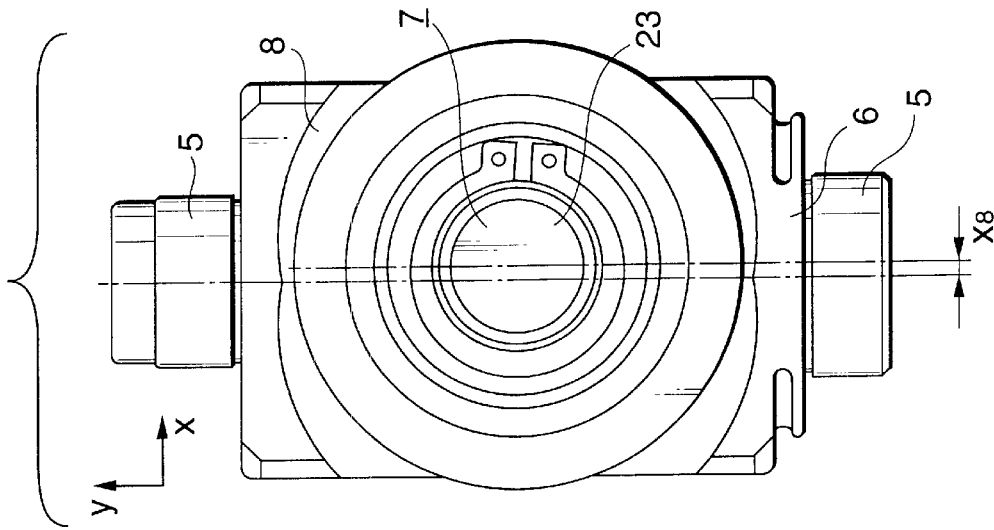
FIG. 12A is a sectional view showing a structure including a trunnion and a power roller when viewed in the direction of an arrow B in FIG. 11 in a state that no power is transmitted.
Figure 12B:
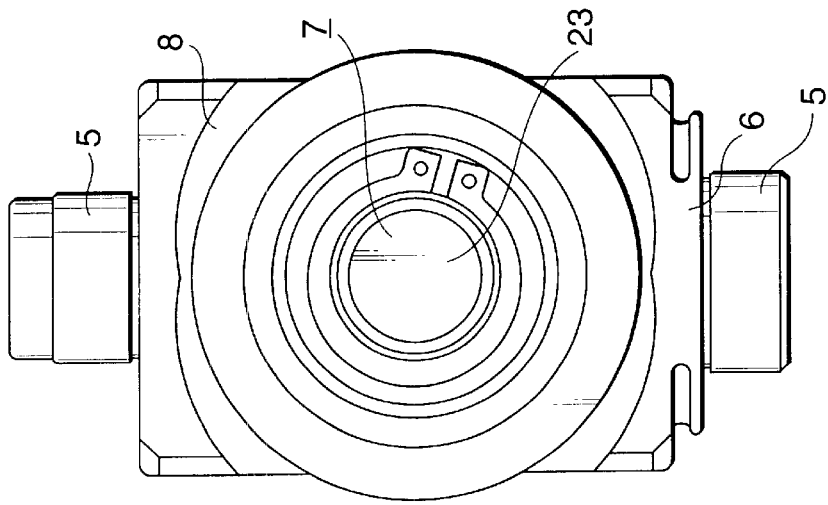
FIG. 12B is a sectional view showing a structure including a trunnion and a power roller when viewed in the direction of an arrow B in FIG. 11 in a state that large power is transmitted.

As the toroidal type continuously variable transmission for large engine power, a double cavity type toroidal type continuously variable transmission of which the cavity diameter $D_0$ is 130 mm (cavity diameter $D_0$=distance between the pivot shafts 5, 5 provided at both ends of the trunnions 6, 6, FIG. 4) was used. The operating conditions in the test were: the number of revolutions each of the input-side disks 2A and 2B was 4000 rpm; input torque was 300 Nm; and the speed change ratio was 0.5 (the number of revolutions of the output-side disk 4 was ½ of that of the input disks). Dimensions of the radial needle roller bearing 25a were: the diameter of an inscribed circle of each needle roller 45a was 25 mm; the diameter of a circumscribed circle was 33 mm (outside diameter of the cylindrical portion 59 of the needle roller 45a was 4 mm); and the axial length $L_{45a}$ of the needle roller 45a was 16.8 mm.

Under the conditions the above-mentioned, a test for confirming the durability of the radial needle roller bearing 25a was conducted while varying the crowning quantity $\delta_{68}$ of the needle rollers 45 (that is, using the crowning quantity $\delta_{68}$ as a parameter), and thus, proper crowning quantities $\delta_{68}$ could be obtained from the test. In advance of high speed endurance test, an elastic deformation quantity of the power roller 8 wad calculated on the basis of the values of the load applied from the input-disk 2 and output-side disk 4 to the power roller 8 during the operation of the continuously variable transmission, by an FEM process. The deformation quantity obtained was considered into the crowning quantity $\delta_{68}$. A target time for the high speed endurance test was set at 200 hours. The value of 200 hours may be used as a reference value for endurance for the lifetime of the transmission unit of the vehicular transmission.

Figure 36:
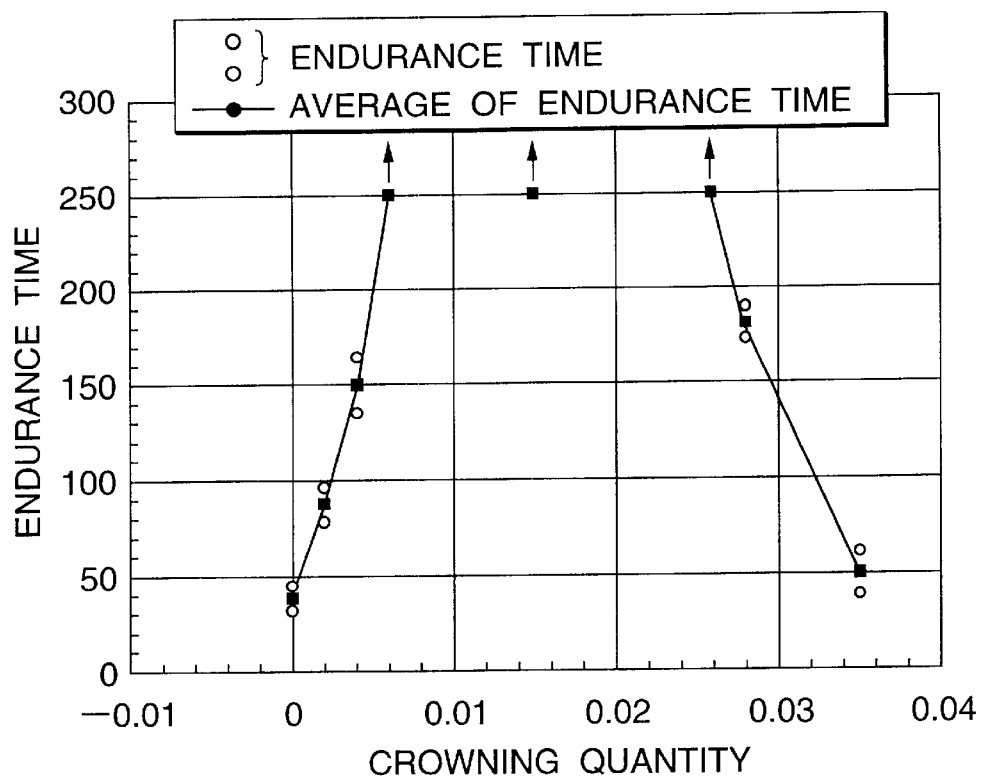
FIG. 36 is a graph showing a relationship between a durability of the radial needle roller bearing and a crowning quantity, obtained in a first test.

The test results are shown in Table 3 and FIG. 36.

TABLE 3

| Test No. | Crowning quantity $\delta_{68}$ at a position distance 2 mm from the end of the needle roller | Test results |
| --- | --- | --- |
| A | No crowning | The rolling surface of the needle roller & the inner race flake after 32 and 45 hours, respectively. |
| B | 0.002 mm | The rolling surface of the needle roller & the inner race flake after 78 and 96 hours, respectively. |
| C | 0.004 mm | The rolling surface of the needle roller & the inner race flake after 164 and 135 hours, respectively. |
| D | 0.006 mm | Test was over 200 hours and terminated after 250 hours, and no flake. The test was conducted two times. |
| E | 0.015 mm | Test was over 200 hours and terminated after 250 hours, and no flake. The test was conducted two times. |
| F | 0.026 mm | Test was over 200 hours and terminated after 250 hours, and no flake. The test was conducted two times. |
| G | 0.028 mm | The rolling surface of the needle roller & the inner race flake after 189 and 172 hours, respectively. |
| H | 0.035 mm | The rolling surface of the needle roller & the inner race flake after 62 and 39 hours, respectively. Levels of sound and vibration were large. |

The toroidal type continuously variable transmission being the small single cavity type of which the cavity diameter $D_0$ is 104 mm was subjected to the high speed endurance test. The operating conditions in the test were: the number of revolutions of the input-side disk 2 was 4000 rpm; input torque was 60 Nm; and the speed change ratio was 0.5. Dimensions of the radial needle roller bearing 25a were: the diameter of an inscribed circle of each needle roller 45a was 16 mm; the diameter of a circumscribed circle was 20mm (outside diameter of the cylindrical portion 69 of the needle roller 45a was 2 mm); and the axial length $L_{45a}$ was 13.8 mm.

Figure 37:
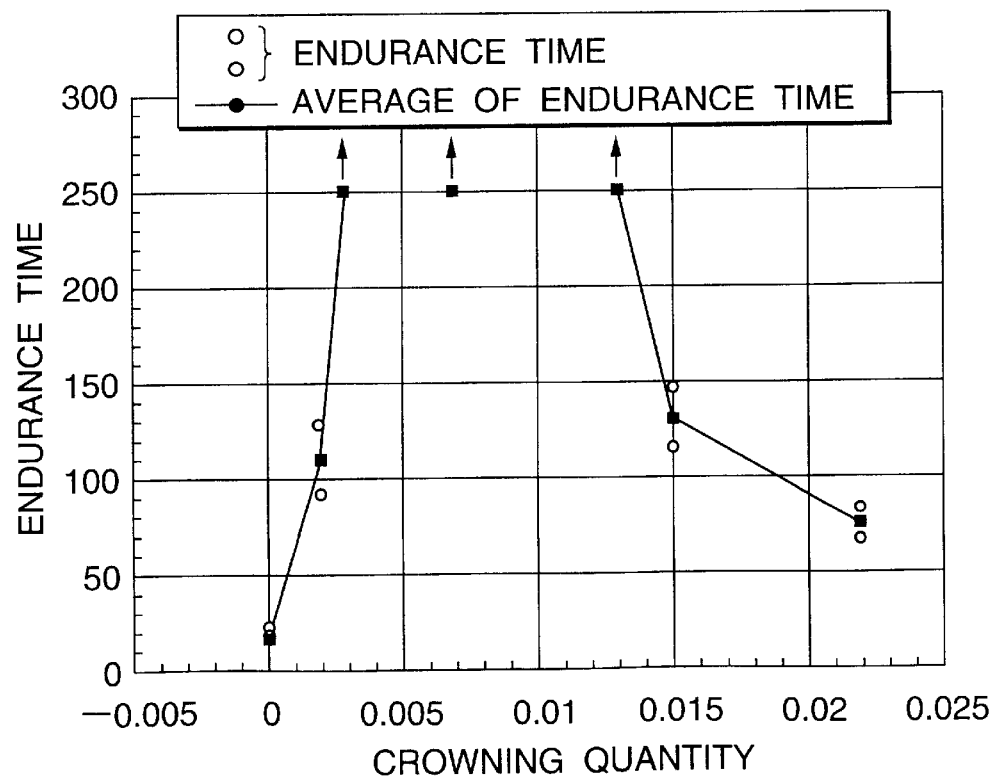
FIG. 37 is a graph showing a relationship between a durability of the radial needle roller bearing and a crowning quantity, obtained in a second test.

The test results are shown in Table 4 and FIG. 37.

TABLE 4

| Test No. | Crowning quantity $\delta_{68}$ at a position distance 1.5 mm from the end of the needle roller | Test results |
| --- | --- | --- |
| A | No crowning | The rolling surface of the needle roller & the inner race flake after 21 and 16 hours, respectively. |
| B | 0.002 mm | The rolling surface of the needle roller & the inner race flake after 92 and 129 hours, respectively. |
| C | 0.003 mm | Test was over 200 hours and terminated after 250 hours, and no flake. The test was conducted two times. |

TABLE 4-continued

| Test No. | Crowning quantity $\delta_{68}$ at a position distance 1.5 mm from the end of the needle roller | Test results |
| --- | --- | --- |
| D | 0.007 mm | Test was over 200 hours and terminated after 250 hours, and no flake. The test was conducted two times. |
| E | 0.013 mm | Test was over 200 hours and terminated after 250 hours, and no flake. The test was conducted two times. |
| F | 0.015 mm | The rolling surface of the needle roller & the inner race flake after 148 and 117 hours, respectively. |
| G | 0.022 mm | The rolling surface of the needle roller & the inner race flake after 85 and 68 hours, respectively. Levels of sound and vibration were large. |

As seen from the test results, when the outside diameter of the cylindrical portion 69 of the needle roller 45a is 4 mm, a target durability is secured in a condition that the crowning quantity $\delta_{68}$ is within the range from 0.006 mm to 0.026 mm. When it is 2 mm, the target durability is secured in a condition that the crowning quantity $\delta_{68}$ is within 0.003 mm to 0.013 mm. In those cases, to secure a satisfactory durability, the crowning quantity $\delta_{68}$ must be 0.15% to 0.65% of the outside diameter $D_{69}$ of the cylindrical portion 69 of the needle roller 45a. The crowning quantity $\delta_{68}$ was measured at a position closer to the center of the needle roller 45a (axially viewed) by 5 to 15% of the axial length $L_{45a}$ of the needle roller 45a, measured from the end face thereof. In the actual endurance test, the measuring point was distanced 2 mm (11.9%) from the end face of the needle roller when the axial length $L_{45a}$ is 16.8 mm (outside diameter=4 mm). It was distanced 1.5 mm (10.9%) from the end face of the needle roller when the axial length $L_{45a}$ is 13.8 mm (outside diameter=2 mm). In sample E where the axial length $L_{45a}$ is 16.8 mm (outside diameter=4 mm), the crowning quantity was 0.011 mm (0.275%) at a position distanced 2.5 mm (14.9%) from the end face. The crowning quantity was also 0.023 mm (0.58%) at a position distanced 0.9 mm (5.4%) from the end face. Those figures satisfy the conditions set forth in claim. In sample D where the axial length $L_{45a}$ is 13.8 mm, the crowning quantity was 0.005 mm (0.25%) at a position distanced 2.0 mm (14.5%) from the end face. The crowning quantity was also 0.010 mm (0.5%) at a position distanced 0.7 mm (5.1%) from the end face. The conditions set forth in claim are satisfied in those figures.

When an initial radial gap of the radial needle roller bearing 25a is set to be large, a slant of the power roller 8 to the pivot shaft portion 23 of the displacement shaft 7 is large, to thereby cause unpleasant sound and vibrations during the operation of the toroidal type continuously variable transmission. Further, due to a variation and the reversal of the torque to be transmitted by the continuously variable transmission (reversal : switching of the driving state to and from an engine braking state), the power roller 8 is repeatedly biased to one side (when viewed in the radial direction) by a distance corresponding to the radial gap. This results in increasing an unresponsive zone (where the speed change is not conducted even if a speed change signal is input), and this phenomenon causes a disadvantage in the speed change control.

For this reason, it is preferable that the actual radial gap, while somewhat considering the deformation quantity of the power rollers 8, is somewhat larger than a gap recommended for the radial needle roller bearing constructed with the needle rollers 45a, 45a and the retainer 53 (cage and roller), written in a catalog of those component parts. In a case that the outside diameter (diameter of the inner raceway 54) of the pivot shaft portion 23 of the displacement shaft 7 is 15 to 30 mm and the inside diameter (diameter of the outer raceway 55) of the power roller 8 is 20 to 40 mm, a preferable radial gap in the initial stage (the power roller 8 being free) is approximately 0.020 to 0.055 mm in diameter. For this values, the recommended gap according to catalog are approximately 0.08 to 0.035 mm.

To prevent the early flaking, it is preferable that the surface roughness of the contact portions in contact with the rolling surfaces of the needle rollers 45a is set to be good. The catalog recommends that the surface roughness Rmax of the outer peripheral surface (inner raceway 54) of the pivot shaft portion 23 of the displacement shaft 7 is 1.6S, and the surface roughness Rmax of the inner peripheral surface (outer race 54) of the power roller 8 is 3.2S. It is preferable that those actual surface roughness are set to be somewhat smaller than the recommended ones (smoother). The surface hardness of the inner raceway 54 and the outer raceway 55 is set to be substantially equal to that of the rolling surfaces of the needle rollers 45a, 45a, set at HRc60 or higher as recommended in the catalog.

With thus structured and operated toroidal type continuously variable transmission, the invention can provide an excellent durability thereof, and thus, promote the practical use of the toroidal type continuously variable transmission.

The present disclosure relates to the subject matter contained in Japanese patent application Nos. Hei. 10-6791 filed on Jan. 16, 1998, Hei. 10-11661 filed on Jan. 23 and Hei. 11-3646 filed on Jan. 11, 1999 which are expressly incorporated herein by reference in its entirety.

While only certain embodiments of the invenoin have been specifically described herein, it will apparent that numerous modifications may be made thereto without departing from the spirit and scope of the invention.

What is claimed is:

1. A toroidal type continuously variable transmission, comprising:

at least one pair of disks, each with one surface in the axial direction of which has a concave surface being arcuate in cross section, said disks concentrically disposed on each other and rotatably supported independent from each other in a state that said concave surfaces are opposed to each other;

a trunnion swingable about a pivot shaft situated at a torsional relation with respect to a center axis of said pair of disks, said trunnion having a circular hole formed in a direction perpendicular to the axial direction of the pivot shaft at a middle portion thereof;

a displacement shaft including a support shaft portion and a pivot shaft portion that are parallel and eccentric to each other, said support shaft portion rotatably supported to the inner surface of said circular hole through a radial bearing, said pivot shaft portion being protruded from an inner surface of the middle portion of said trunnion;

a power roller having an arcuate convex surface on the peripheral surface thereof, said power roller nipped between said concave surfaces of said pair of disks while being rotatably supported on an outer circumferential surface of said pivot shaft portion through a radial needle roller bearing; and a thrust bearings located between said power roller and the inner surface of the middle portion of said trunnions, wherein said displacement shafts are made of steel, the outer peripheral surface of at least said pivot shaft portion of said displacement shaft is formed with a carbonitriding layer containing 0.8 to 1.5 wt % of carbon and 0.05 to 0.5 wt % of nitrogen, and at least the outer peripheral surface is quenched and tempered after the carbonitriding process thereof.

2. A toroidal type continuously variable transmission, comprising:

first and second disks concentrically disposed on each other and rotatably supported about a mutual central axis, said first and second disks respectively having arcuate concave surfaces, which are opposed to each other;

trunnions swingable about a pivot shaft situated at a torsional relation which does not intersect with the central axis and is a position perpendicular to the central axis;

a displacement shaft disposed on a middle portion of said trunnion and supported in such a manner as to project from an inner surface of said trunnion; and a power roller disposed on an inner surface side of said trunnion and nipped between said first and second disks in such a manner as to be rotatably supported on the periphery of said displacement shaft through a radial bearing; the peripheral surface of said power roller having an arcuate convex surface contactable with said concave surfaces of said first and second disks, wherein said displacement shaft includes a support shaft portion and a pivot shaft portion being arranged to be parallel to each other and eccentric to each other, and an eccentric quantity of each said displacement shaft being a distance between said support shaft portion and said pivot shaft portion is within a range from 5 mm to 15 mm.

* * * * *